(12) United States Patent
Oh

(10) Patent No.: US 8,251,827 B2
(45) Date of Patent: Aug. 28, 2012

(54) CONSTANT VELOCITY JOINT OF TRIPOD TYPE

(75) Inventor: Seung Tark Oh, Farmington Hills, MI (US)

(73) Assignee: Hyundai Wia Corporation (KR)

( * ) Notice: Subject to any disclaimer, the term of this patent is extended or adjusted under 35 U.S.C. 154(b) by 594 days.

(21) Appl. No.: 11/947,307

(22) Filed: Nov. 29, 2007

(65) Prior Publication Data
US 2009/0143149 A1 Jun. 4, 2009

(51) Int. Cl.
*F16D 3/205* (2006.01)
(52) U.S. Cl. .................................... 464/111; 464/905
(58) Field of Classification Search .................. 464/111, 464/905
See application file for complete search history.

(56) References Cited

U.S. PATENT DOCUMENTS

| | | | |
|---|---|---|---|
| 4,808,144 A | 2/1989 | Orain | |
| 4,854,917 A | 8/1989 | Mizukoshi | |
| 5,203,741 A | 4/1993 | Turner, et al. | |
| 5,256,107 A | 10/1993 | Matsumoto et al. | |
| 5,538,473 A | 7/1996 | Busch et al. | |
| 6,454,655 B1 | 9/2002 | Kudo et al. | |
| 6,533,668 B2 | 3/2003 | Mizukoshi et al. | |
| 6,682,434 B2 | 1/2004 | Kawakatsu et al. | |
| 6,699,134 B2 | 3/2004 | Sams et al. | |
| 6,726,570 B2 | 4/2004 | Sugiyama et al. | |
| 6,776,719 B2 | 8/2004 | Perrow | |
| 7,083,522 B2 | 8/2006 | Bongartz | |
| 7,121,950 B2 | 10/2006 | Izumino et al. | |
| 7,819,752 B2 * | 10/2010 | Oh ............................. | 464/111 |
| 2004/0157667 A1 * | 8/2004 | Ishijima et al. ............. | 464/111 |
| 2006/0030413 A1 | 2/2006 | Izumino et al. | |
| 2006/0217205 A1 | 9/2006 | Izumino et al. | |
| 2007/0066405 A1 | 3/2007 | Ando et al. | |
| 2007/0093302 A1 | 4/2007 | Perrow et al. | |

FOREIGN PATENT DOCUMENTS

| | | |
|---|---|---|
| GB | 2-138-538 A | 4/1984 |
| KR | 10-2004-0071382 A | 8/2004 |
| WO | 90/07067 A1 | 6/1990 |

* cited by examiner

*Primary Examiner* — Gregory Binda
(74) *Attorney, Agent, or Firm* — Park & Associates IP Law, P.C.

(57) ABSTRACT

A constant velocity joint comprises: a hollow housing having a plurality of guide grooves therein, a tripod having a plurality of trunnions. Each trunnion includes two opposing spherical contact surfaces disposed in the directions subject to load, and two opposing side surfaces disposed between the two opposing spherical contact surfaces and in the directions perpendicular to the spherical surfaces and not subjecting to the load. A cross sectional shape of the trunnion, the cross section taken in a direction perpendicular to the longitudinal axis of the trunnion, has a thickness at one or both lateral sides of the trunnion the same as or slightly less than a maximum non-interfering thickness of the trunnion. Preferably, a groove of circular or oval shape is formed on each of the two opposing spherical contact surfaces, the groove for retaining grease therein to lubricate contact surfaces.

15 Claims, 28 Drawing Sheets

FIG. 18(c)
FIG. 18(d)
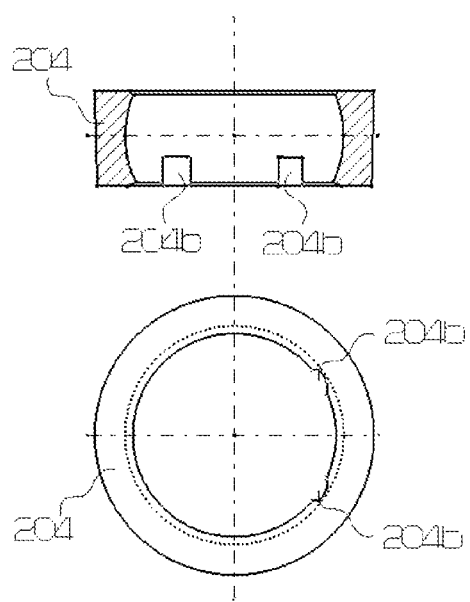
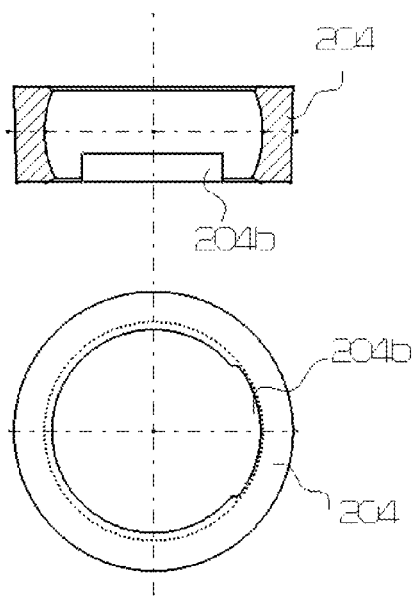

CONSTANT VELOCITY JOINT OF TRIPOD TYPE

FIELD OF THE INVENTION

The present invention relates to a constant velocity joint of tripod type, which is disposed between a drive shaft and a driven shaft coupled to each other and typically used in a drive axle of, for example, an automobile for transmitting rotational torque between the rotating shafts.

BACKGROUND OF THE INVENTION

Tripod type constant velocity joints are well known in the automobile industry as one type of constant velocity joints used in the drive system of automobiles to transfer a uniform torque and a constant speed, while operating with a wide range of joint angle. For instance, one example of the tripod type constant velocity joint was illustrated in Japanese Patent Application, S62-233522 as shown in FIGS. 1-2. This tripod type constant velocity joint typically includes tripod 15 fixed to an end of the second rotating shaft, which functions as a driven member, and hollow cylindrical housing 13 fixed to an end of the first rotating shaft 12 which functions as a drive member. Grooves 16 are formed at three locations on the inner face of the housing 13 at equal spacing in the circumferential direction and extend in the shaft direction of the housing 13.

The tripod 15 comprises a boss 17 connected to the second rotating shaft 14, and trunnions 18 each having a cylindrical shape and extending radially from three locations at equal spacing around the boss 17. Each trunnion 18 has a roller 19 fixed at a distal end of the trunnion and with needle rollers 20 engaged therein. In this arrangement, each roller 19 can freely rotate about the trunnion 18 while also be displaced in the axial direction of the trunnion 18. The constant velocity movement between the first and second rotating shafts is ensured with the rollers 19 rotatably and displaceably engaging in the grooves 16 disposed along the inner face of the housing 13. In order to facilitate the sliding movement, a pair of side faces 16a are formed in circular recesses on each side of the respective grooves 16, and each roller 19 is supported rotatably and pivotally along the side faces 16a of the grooves.

As the first rotating shaft 12 rotates, its rotational force is transmitted from housing 13, through roller 19, needle rollers 20, trunnions 18, and to the boss 17 of the tripod 15. This makes the boss 17 rotate, and which also causes rotation of the second rotating shaft 14. When the joint angle of the two rotating shafts 12 and 14 is not zero, a central axis of the first rotating shaft 12 is not aligned with that of the second rotating shaft 14, and each of the trunnion 18 displaces relative to the side face 16a of the guide grooves 16 to move around the tripod 15, as shown in FIG. 1 and FIG. 2. As a result, the rollers 19 supported at the ends of the trunnions 18 move along the axial directions of the trunnions 18, respectively, while rolling on the side faces 16a of the guide grooves 16. Such movement ensures that a constant velocity between the first and second rotating shaft is achieved.

When the first and second shafts rotate with a joint angle present, each roller 19 moves with complexity. For example, each roller 19 moves in the axial direction of the housing 13 along each of the side faces 16a of the respective guide grooves 16, while the rollers 19 change in orientation and further displace in the axial direction of the trunnion 18. Such movement of the rollers 19 cannot cause a relative movement between a peripheral outside face of each of the rollers 19 and each of the side faces 16a to be smoothly made. Thus, a relatively large friction occurs between the faces. As a result, this tripod type constant velocity joint produces three-directional axial forces as the shafts rotate. In the application of a tripod joint to the vehicles, it is known that the axial forces may cause a transverse vibration typically referred to as "shudder", if a large torque is transmitted with a relatively large joint angle present.

In order to restrain or reduce such conventional shudder problems, various suggestions have been introduced in the art. For example, U.S. Pat. No. 6,533,668 B2 discloses a constant velocity joint construction which can reduce the shudder problem by modifying the conventional contact ellipse. As shown in FIG. 3(a), the trunnion 18' of this joint is produced to have an elliptical cross-section when viewed from an axis normal to the trunnion shaft. As a result, the elliptical section includes a shorter diameter "B" in the length not receiving a load, and a longer diameter "A" in the length for receiving a load. This is to make a contact pattern between the inner spherical surface of the inner roller 19b and the trunnion 18' relatively closer to a circle, when receiving a torque for a load. As a result, a longer contact diameter a' (FIG. 3(b)) becomes smaller than the longer contact diameter of previously known constant velocity joints which have trunnions with a circular cross-section, for example, such as the trunnions shown in FR275280 and Japanese Publication No. H3-172619. However, it still has an elliptical contact pattern even though the degree of ellipse is reduced because a curvature of a longitudinal cross-section of the trunnion 18' formed by radius r2 and R is not equal to a curvature of an axial cross-section of the trunnion 18 formed by an ellipse 18a defined as a longer diameter A and a shorter diameter B.

When these joints rotate with a joint angle present upon receiving loads, a pivotal movement of counterclockwise direction of trunnion 18' causes a pivotal sliding action to take place on the contact ellipse. Then the pivotal sliding action operates as a frictional spinning moment so as to change a rolling direction of the roller assembly 19, which comprises the inner roller 19b and the outer roller 19a with needle bearings 20 engaged there-between. As a result, direction of the roller assembly 19 changes and it becomes in contact with inner or outer face of the guide groove 16, and thus, increasing a frictional contact force there-between. Moreover, the roller assembly 19 displaces not to parallel to the guide groove 16. Hence it is difficult for the roller assembly 19 to be smoothly rolled, and causes a significant rolling resistance.

Moreover, for manufacturing the constant velocity joint of FIG. 3, there are considerable difficulties not only to machine a complex spherical surface defined by a curvature of a longitudinal cross-section of the trunnion 18' formed by radius r2 and R and the ellipse shape 18' defined as a longer diameter A and a shorter diameter B, but also to measure the trunnion 18' having a complex three dimensional profile, in terms of both inspection and quality control. These difficulties cause the contact pattern mentioned above to be inconsistent in terms of quality, which leads to high costs in manufacturing perspective and also to potential quality control issues.

Moreover, in order to provide grease-entry space for better durability and smooth operation, space "s" is provided between the upper and lower ends at the inner face of the inner roller 19b and the upper and lower portions of the spherical face of the trunnion 18', as shown in FIG. 3(a). However, due to the relative pivotal movement of the trunnion 18' within the open inner surface of the inner roller 19b, the grease flows out easily from the open space "s" and sufficient amount of grease cannot be retained in the open space "s" disposed between the spherical face of the trunnion 18' and the upper and lower ends at the inner face of the inner roller 19b. As a result, the joint cannot be lubricated effectively and often suffers aggravated friction problems. This becomes more problematic when the grease is in high density condition, for example, during the initial driving stage of automobile particularly at a cold outside temperature, which causes a significant rolling resistance in the drive system.

SUMMARY OF THE INVENTION

In order to solve the above described and other problems or drawbacks known in the prior art constant velocity joints, the applicant (namely, the inventor) of this invention suggested several improved constant velocity joints and assembly methods thereof, for example, such as disclosed in application Ser. No. 11/840,194 filed Aug. 16, 2007 and entitled "CONSTANT VELOCITY JOINT OF TRIPOD TYPE", which is now issued as U.S. Pat. No. 7,878,914, which is a continuation-in-part of U.S. patent application Ser. No. 11/750,138 filed on May 17, 2007, which is now issued as U.S. Pat. No. 7,819,752, the entire contents of which are incorporated herein by reference. The present invention provides further modifications and/or improvements to the applicant's prior application Ser. No. 11/750,138 and Ser. No. 11/840,194.

According to certain preferred embodiments, the constant velocity joints disclosed in the applicant's pending application Ser. No. 11/750,138 and Ser. No. 11/840,194 include, among other members, plural (e.g., three) trunnions each having a pair of cylindrical protrusions protruded a predetermined distance from the outer surface of the trunnion in a direction generally perpendicular to the axis of the corresponding trunnion, as illustrated in FIG. 4. These cylindrical protrusions provide a reduced contact surface between the trunnion and the inner face of the corresponding inner roller, and thus, reducing the frictional spinning force acting on the contact ellipse made between the outer face of the trunnion and the inner face of the inner roller, due to the pivotal sliding movement of the trunnion axis known in the art.

The constant velocity joints disclosed in the applicant's previous applications further provide a sufficient lubrication mechanism between the inner race and the trunnion (in particular, between the protruded cylindrical protrusions and the inner surface of the inner race), and between the outer roller, the needle rollers, and the inner roller, to minimize the rolling resistance when rotating with any joint angle present. Moreover, methods of assembling the joints are also provided, in which the joint is also configured to prevent from an accidental disassembly in normal operating condition.

Accordingly, one object of the present invention is to provide a tripod type constant velocity joint which is further modified and/or improved from those disclosed by the above-identified inventions of the applicant.

Another object of the present invention is to provide a tripod type constant velocity joint having a durable structure and mechanical strength and also reliable under adverse and severe operating conditions.

Another object of the present invention is to provide a tripod type constant velocity joint which has a reliable structure and easy to assemble. Another object of the present invention is to provide a reliable tripod type constant velocity joint and methods of assembling the joint, in which the joint is also configured not to be accidentally disassembled in operation. Further objects and features of the present invention can be recognized from the accompanied drawings and the following descriptions of the invention. A further object of the present invention is to provide a tripod type constant velocity joint having a sufficient lubrication mechanism, for example, between the inner race and the trunnions, and between the outer roller, the needle rollers, and the inner roller, to minimize the rolling resistance when rotating with any joint angle present.

The constant velocity joint of the present invention includes, among other members, plural (e.g., three) trunnions each having two opposing spherical contact surfaces disposed in the directions subject to the load and also having two opposing and generally planar or partially curved or angled surfaces disposed in the directions perpendicular to the spherical surfaces and not subjecting to the load, for example, as illustrated in FIGS. 5, 6, 10, 15-17 to be described later in details. According to one preferred embodiment, the trunnions include a groove of circular or oval shape provided at the central location of each spherical contact surface of the trunnions, and thereby, define a main spherical contact area in circular or oval shape of predetermined size at each of the spherical surface of the trunnions, for example, as illustrated in FIGS. 5, 6, and 9-11 to be described later in details. According to one preferred embodiment, the lateral spherical surface outside of the central main contact area has the same spherical radius of contact as that of the central main spherical contact surface and provides an additional contact surface, and thereby, enhancing the mechanical strength and durability of the trunnions which can endure a potential high stress concentration on the contact surface. Alternatively, owing to the additional lateral contact surface, the overall size of each trunnion can be reduced (particularly, when compared to the embodiment of FIG. 4) while satisfying the mechanical strength requirements of the trunnions. This may also provide a potential to reduce the entire size of the tripod and the constant velocity joint.

The circular groove recessed from the spherical contact surface of the trunnion is for retaining additional grease therein to further lubricate the contact surface between the trunnions and the generally spherical inner surface of the inner race, thus, further enhancing the durability and life time of the joints. This lubrication is in addition to the main lubrication to be done by the grease retained in the space between the inner surface of the inner race and the two opposing and generally planar or partially curved or angled surfaces disposed in the directions perpendicular to the generally spherical surfaces and not subjecting to the load.

In an alternative embodiment, the circular or oval groove can be omitted from the trunnions, for example, as illustrated in FIGS. 7 and 8 and to be described later in details. In this embodiment, the contact surface between the spherical contact surface of trunnions and the generally spherical inner surface of the inner race is lubricated by the grease retained only in the space between the spherical inner surface of the inner race and the two opposing and generally planar or partially curved or angled surfaces disposed in the directions perpendicular to the spherical contact surfaces, that are not subject to the load.

According to another preferred embodiment of the present invention, the trunnions of the constant velocity joint include two opposing spherical contact surfaces disposed in the directions subject to the load, and two opposing and generally planar or partially curved or angled surfaces disposed in the directions perpendicular to the spherical contact surfaces, that are not subject to the load. According to one preferred embodiment, with the two opposing and generally planar or partially curved or angled surfaces disposed in the directions perpendicular to the spherical surfaces, the trunnion has a complex shape with its cross section, taken in a direction perpendicular to the trunnion shaft, having a thickness gradually varying between a larger thickness T and a smaller thickness S relative to the axial distance in cross section from the neck of the trunnion, while enhancing the mechanical strength and durability of the trunnion and also enabling an easy assembly with the inner roller.

In one embodiment, the cross-sectional shape taken at the upper portion of the trunnion has a larger thickness "T" at the left side and is gradually decreased until it reaches a smaller thickness "S" at the right side of the trunnion; the cross-sectional shape taken at the lower portion of the trunnion has a smaller thickness "S" at the left side and is gradually increased until it reaches a larger thickness "T" at the right side of the trunnion; and the cross-sectional shapes in-between the upper and lower portions are gradually varied from the cross-sectional shape at the upper portion to the cross-sectional shape at the lower portion of the trunnion, for example, as illustrated in FIGS. 10(a)-10(f) to be described later in details.

In another embodiment, the cross-sectional shape taken at the upper portion of the trunnion has the larger thickness "T" at the left side and the smaller thickness "S" at the right side of the trunnion, and the cross-sectional contour between the left and right sides is gradually varied to define a convex shape as a whole, preferably with the contour thereof defined by a surface radius R, as illustrated in FIG. 15(b). To the contrary, the cross-sectional shape taken at the lower portion of the trunnion has the smaller thickness "S" at the left side and the larger thickness "T" at the right side, and the cross-sectional contour between the left and right sides is gradually varied to define a convex shape as a whole, preferably with the contour thereof defined by a surface radius R, as illustrated in FIG. 15(c). The cross-sectional shapes in-between the upper and lower portions are gradually varied from the cross-sectional shape at the upper portion to the cross-sectional shape at the lower portion of the trunnion. As a result, the cross-sectional shape taken at the middle portion of the trunnion includes a generally planar shape or a slightly convex shape.

According to one preferred embodiment of the present invention, in order to solve the above described problems and other problems to be recognized by following disclosure, a constant velocity joint for a drive system with a first rotating shaft and a second rotating shaft coupled with the constant velocity joint, comprises:

a hollow housing having a plurality of guide grooves therein, the guide grooves extending in an axial direction of the housing and spaced equally apart in a circumferential direction of the housing;

a tripod having a plurality of trunnions, each trunnion positioned in a corresponding one of the guide grooves of the hollow housing; and a roller assembly including an inner roller, the inner roller having a spherical inner face for receiving a corresponding one of the trunnions therein, and an outer roller mounted on an outer face of each inner roller, the roller assembly for transmitting a load between the first and second rotating shafts to drive the driving system;

wherein each trunnion includes two opposing spherical contact surfaces disposed in the directions subject to the load, and two opposing side surfaces disposed between the two opposing spherical contact surfaces and in the directions perpendicular to the spherical surfaces and not subjecting to the load;

wherein a cross sectional shape of the trunnion, the cross section taken in a direction perpendicular to the longitudinal axis of the trunnion, has a thickness at one or both lateral sides of the trunnion the same as or slightly less than a maximum non-interfering thickness of the trunnion, the maximum non-interfering thickness measured with the inner roller inclined by a predetermined degree relative to the longitudinal axis of the trunnion to assemble the trunnion into the inner roller.

According to another preferred embodiment of the present invention, a constant velocity joint for a drive system having a first rotating shaft and a second rotating shaft coupled with the constant velocity joint, comprises:

a hollow housing having a plurality of guide grooves therein, the guide grooves extending in an axial direction of the housing and spaced equally apart in a circumferential direction of the housing;

a tripod having a plurality of trunnions, each trunnion positioned in a corresponding one of the guide grooves of the hollow housing; and a roller assembly including an inner roller, the inner roller having a spherical inner face for receiving a corresponding one of the trunnions therein, and an outer roller mounted on an outer face of each inner roller, the roller assembly for transmitting a load between the first and second rotating shafts to drive the driving system;

wherein each trunnion includes two opposing spherical contact surfaces disposed in the directions subject to the load, and two opposing side surfaces disposed between the two opposing spherical contact surfaces and in the directions perpendicular to the spherical surfaces and not subjecting to the load;

wherein a cross sectional shape of the trunnion, the cross section taken in a direction perpendicular to the longitudinal axis of the trunnion, has a thickness at one or both lateral sides of the trunnion the same as or smaller than a maximum non-interfering thickness of the trunnion, the maximum non-interfering thickness measured with the inner roller inclined by a predetermined degree relative to the longitudinal axis of the trunnion to assemble the trunnion into the inner roller;

wherein a groove of circular or oval shape is formed on each of the two opposing spherical contact surfaces, the groove for retaining grease therein to lubricate contact surfaces between the inner roller and the trunnion.

According to another preferred embodiment of the present invention, a method of assembling a trunnion of a constant velocity joint into an inner roller of a roller assembly, comprises the steps of:

providing a roller assembly for a constant velocity joint, the roller assembly including an outer roller, and an inner roller having a spherical inner face;

providing a constant velocity joint having a tripod with a plurality trunnions, each trunnion including two opposing spherical contact surfaces disposed in the directions subject to the load, and two opposing side surfaces disposed between the two opposing spherical contact surfaces and in the directions not subject to the load;

measuring a maximum non-interfering thickness of the trunnion which is a maximum thickness of the trunnion, having the two opposing spherical contact surfaces of a diameter, that can be inserted into the inner roller without interference while inclining the inner roller by a predetermined degree relative to the longitudinal axis of the trunnion;

providing the trunnion to have a cross sectional shape, the cross section taken in a direction perpendicular to the longitudinal axis of the trunnion, with a thickness at one or both lateral sides of the trunnion the same as or 0-30% smaller than the maximum non-interfering thickness of the trunnion;

inclining the inner roller with respect to the trunnion to assume the predetermined degree of inclination;

positioning the inclined inner roller partially onto the trunnion, by placing a lower right inner face of the inner roller on an upper right side of the trunnion and positioning a lower left face of the inner roller to meet a lower left side of the trunnion; and completely positioning the inner roller by pushing or rotating a right upper side of the inclined inner roller down without applying excessive external force.

The trunnion preferably includes a neck portion below the trunnion. In one embodiment, the center line of neck portion generally coaxial with the longitudinal axis of the trunnion. In another embodiment, the center of the neck portion is offset a distance from the longitudinal axis of the trunnion to facilitate assembly of the trunnion into the inner roller.

According to one preferred embodiment, the trunnion is provided to have a cross sectional shape, throughout the entire cross sections taken in the direction perpendicular to the longitudinal axis of the trunnion, with the first thickness at the one lateral side being larger than the second thickness at the other lateral side, and the first and second thicknesses are defined by the equations of:

$$0.5D \leq S \leq 0.7D;$$

$$1.0S \leq T \leq 1.2S;$$

where S represents the second thickness at the other lateral side of the trunnion which is the same as or smaller than the maximum non-interfering thickness, T represents the first thickness at the one lateral side of the trunnion which is larger than the maximum non-interfering thickness of the trunnion, and D represents a spherical diameter of the trunnion.

According to another preferred embodiment, the trunnion is provided to have a cross sectional shape, taken in the direction perpendicular to the longitudinal axis of the trunnion, with the first thickness at the one lateral side being larger than the second thickness at the other lateral side, and the first and second thicknesses are defined by the equations of:

$$0.5D \leq S \leq 0.7D;$$

$$1.0S \leq T \leq 1.2S;$$

where S represents the second thickness at the other lateral side of the trunnion which is the same as or smaller than the maximum non-interfering thickness, T represents the first thickness at the one lateral side of the trunnion which is larger than the maximum non-interfering thickness of the trunnion, and D represents a spherical diameter of the trunnion; and wherein the cross sectional shape of the trunnion varies with the thickness gradually varying from the first lateral side of the trunnion to the second lateral side of the trunnion in an alternate manner relative to an axial distance from the center of the tripod, and in a manner such that, by said placing the lower right inner face of the inner roller on the upper right side of the trunnion and by said positioning the lower left inner face of the inner roller to meet the lower left side of the trunnion, the inclined inner roller is partially positioned onto the trunnion with its spherical inner face partially receiving the upper right side of the trunnion with the thickness S and partially receiving the lower left side of the trunnion with the thickness S.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which:

FIG. 12(*b*) a cross-sectional view of the trunnion taken along the line C-C in FIG. 12(*a*);

FIG. 12(*c*) is a cross-sectional view of the trunnion taken along the line A-A in FIG. 12(*a*);

FIG. 15(*b*) is a cross-sectional view taken along A-A in FIG. 15(*a*);

FIG. 15(*c*) is a cross-sectional view taken along C-C in FIG. 15(*a*);

FIG. 18(*e*) illustrates a method of assembling the joint of the invention according to the embodiment shown in FIGS. 18(*a*)-18(*d*).

DETAILED DESCRIPTION OF THE INVENTION

Figure 1:
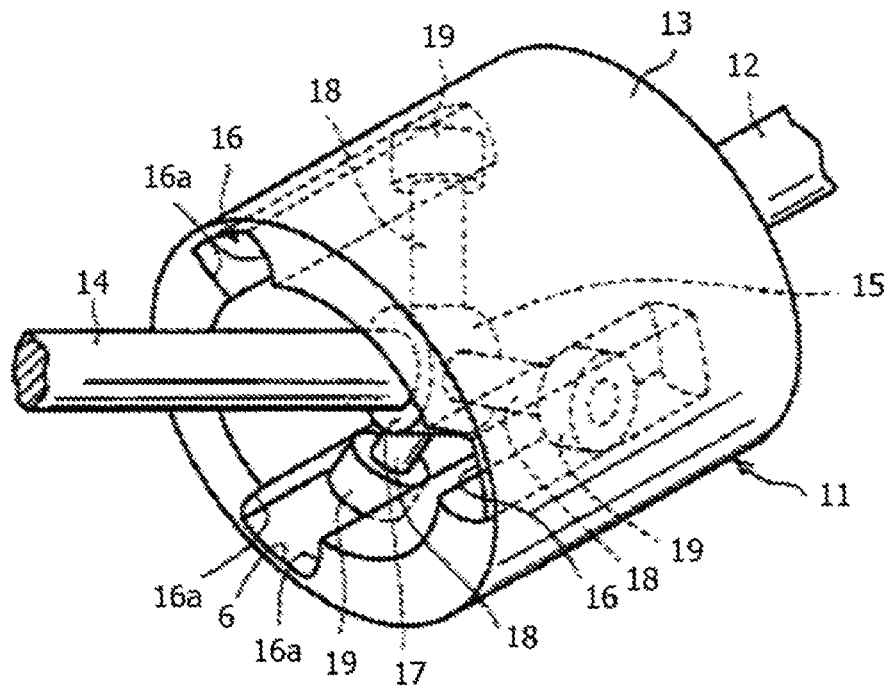
FIG. 1 shows a perspective view of a conventional tripod type constant velocity joint.
Figure 2:
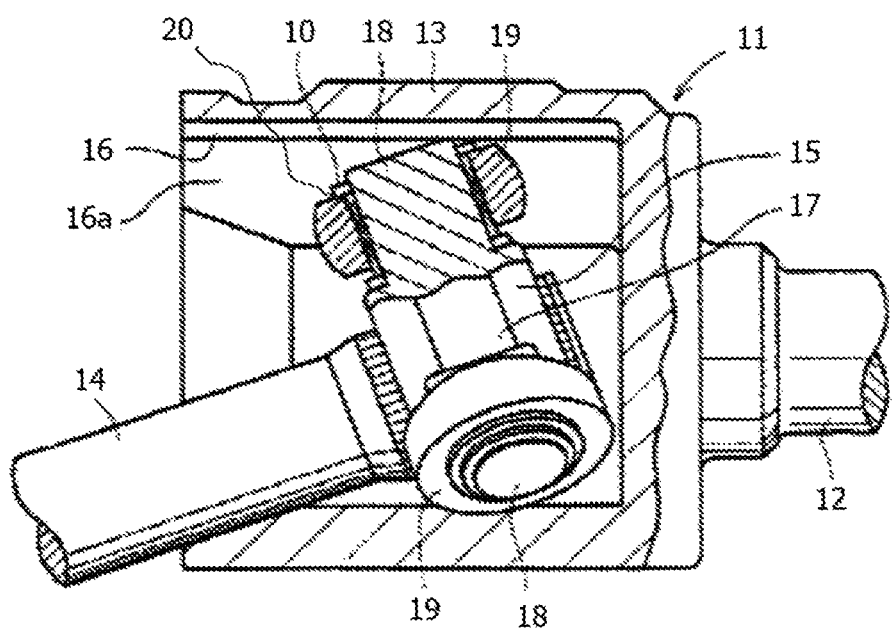
FIG. 2 shows a side cross-sectional view of a conventional tripod type constant velocity joint.
Figure 3A:
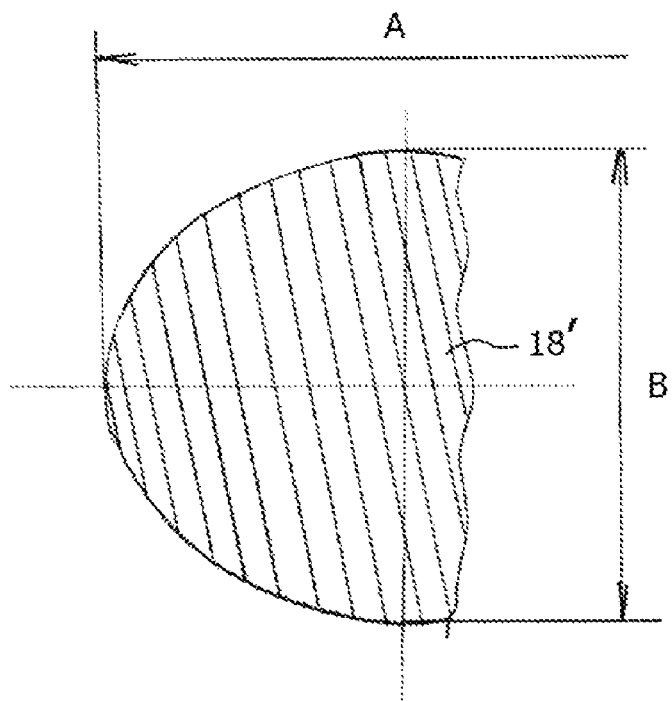
FIGS. 3(a) and 3(b) show a partial cross-sectional view of a trunnion and a partial longitudinal cross-sectional view of the trunnion and the inner roller, according to a conventional tripod type constant velocity joint.
Figure 3B:
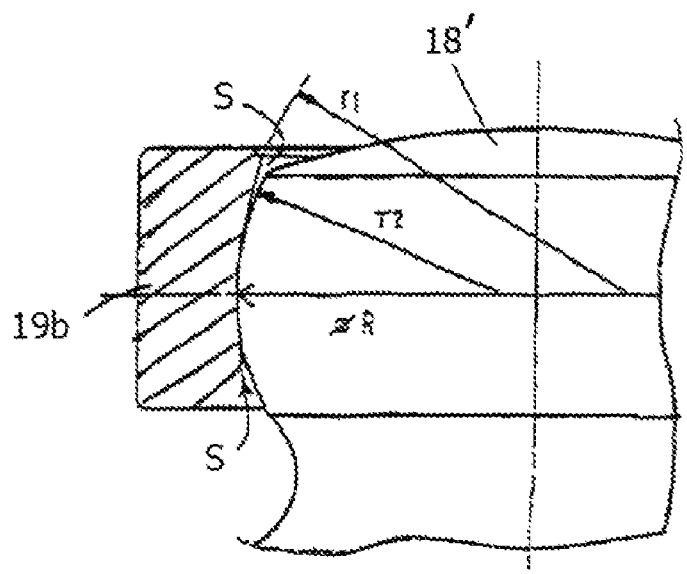
Figure 3C:
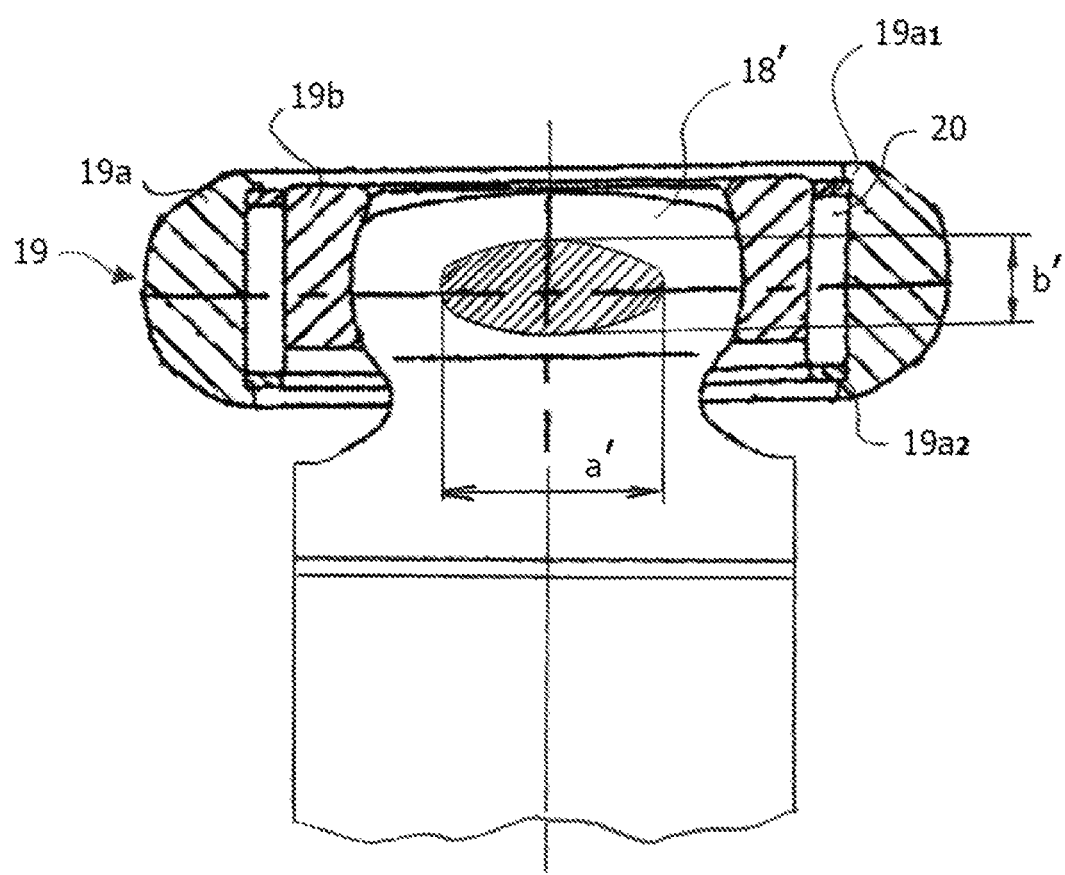
FIG. 3(c) shows partial cross-sectional illustrating a frictional spinning moment generated in the conventional tripod type constant velocity joint of FIG. 3(a)

With reference to FIGS. 5-18 of the drawings, exemplary embodiments of the tripods of the tripod type constant velocity joints of the present invention and methods of assembling the joints are described herein below. The tripods, trunnions, and inner rollers illustrated and described in this application are intended to be constructed and used in association with the constant velocity joints and associated members thereof as described in the above-identified applicant's prior application Ser. No. 11/750,138 (now U.S. Pat. No. 7,819,752) and Ser. No. 11/840,194 (now U.S. Pat. No. 7,878,914), the entire content of which are incorporated herein by reference. Accordingly, detailed descriptions thereof are not repeated herein for simplicity purposes. In addition, it is further noted that the same or similar elements are referred in the accompanied drawings with the same or similar reference characters for simplicity purposes.

Figure 5A:
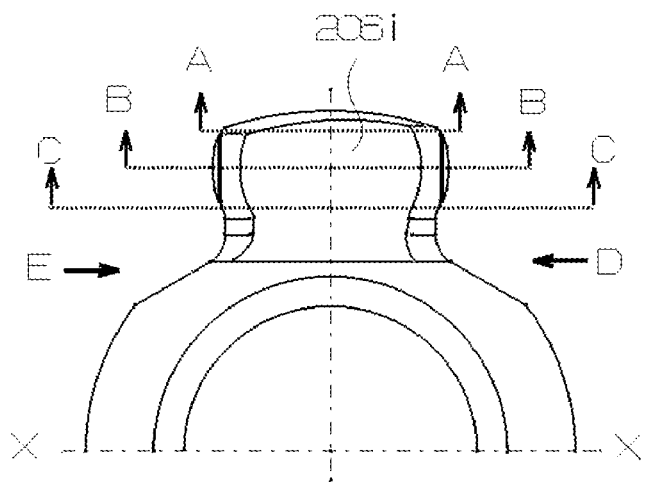
FIG. 5(a) shows a front view of the trunnion according to one preferred embodiment of the present invention.
Figure 5B:
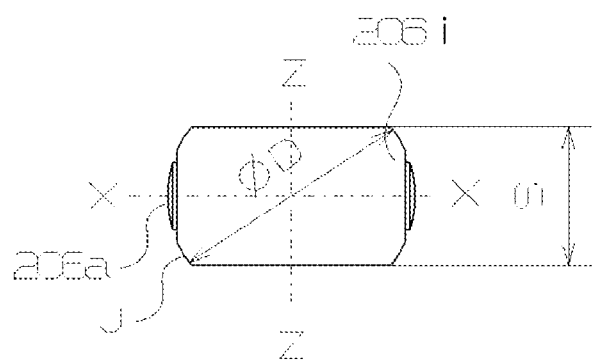
FIG. 5(b) shows a cross-sectional view of the trunnion, taken along the directions A-A, B-B, and C-C in FIG. 5(a)
Figure 5C:
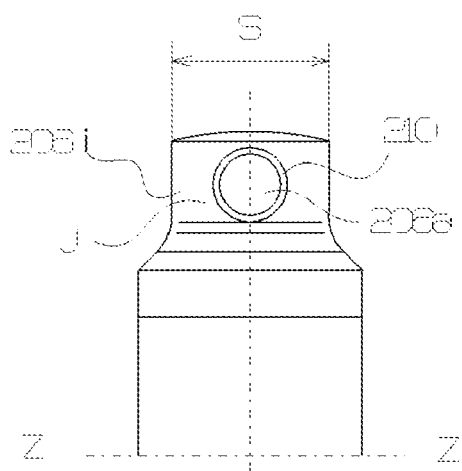
FIG. 5(c) shows a side view of the trunnion, seen from the directions D and E in FIG. 5(a)

FIG. 5 illustrates the tripod for a constant velocity joint according to one preferred embodiment of the present invention, in which FIG. 5(*a*) shows a partial front view of the tripod, FIG. 5(*b*) shows a cross-sectional view of a trunnion of the tripod, taken along the directions A-A, B-B, and C-C in FIG. 5(*a*), and FIG. 5(*c*) shows a side view of the tripod, seen from the directions D and E in FIG. 5(*a*).

With reference to FIGS. 5(*a*)-5(*c*), the tripod includes three trunnions 206 (i.e., 206*i*) equally spaced apart around the tripod, in which, however, only one trunnion is shown in the drawing for simplicity purposes. The trunnion 206*i* includes two opposing spherical contact surfaces (with a spherical diameter φD) disposed in the directions subject to the load as they are in contact with the inner race of the inner roller, and two opposing flat surfaces in the directions perpendicular to the spherical contact surfaces and not subject to the contact load. The trunnion 206*i* has a thickness "S" throughout the length thereof, which is defined by the two parallel and flat surfaces. The space defined between these two opposing flat surfaces and the spherical inner surface of the inner roller is for receiving grease to lubricate the tripod of the invention as is described in the applicant's prior applications identified above. In this and other embodiments, the thickness "S" is particularly selected to a size the same as or "slightly smaller" than "a maximum non-interfering thickness" (S') of the trunnion.

In this application, the term "maximum non-interfering thickness" (S') is defined to be a maximum thickness of the trunnion, in which the trunnion (with two opposing spherical outer contact surfaces of a diameter) is inclined by a predetermined degree (such as degree α in FIGS. 13 and 14) relative to the center axis of the inner roller, and that can be inserted into the inner roller without interference or without applying excessive force. In this application, the term "slightly smaller" or "slightly less than" used in connection with the thickness of the trunnions refers to a size "0-30% smaller" than the referenced thickness.

Figure 4A:
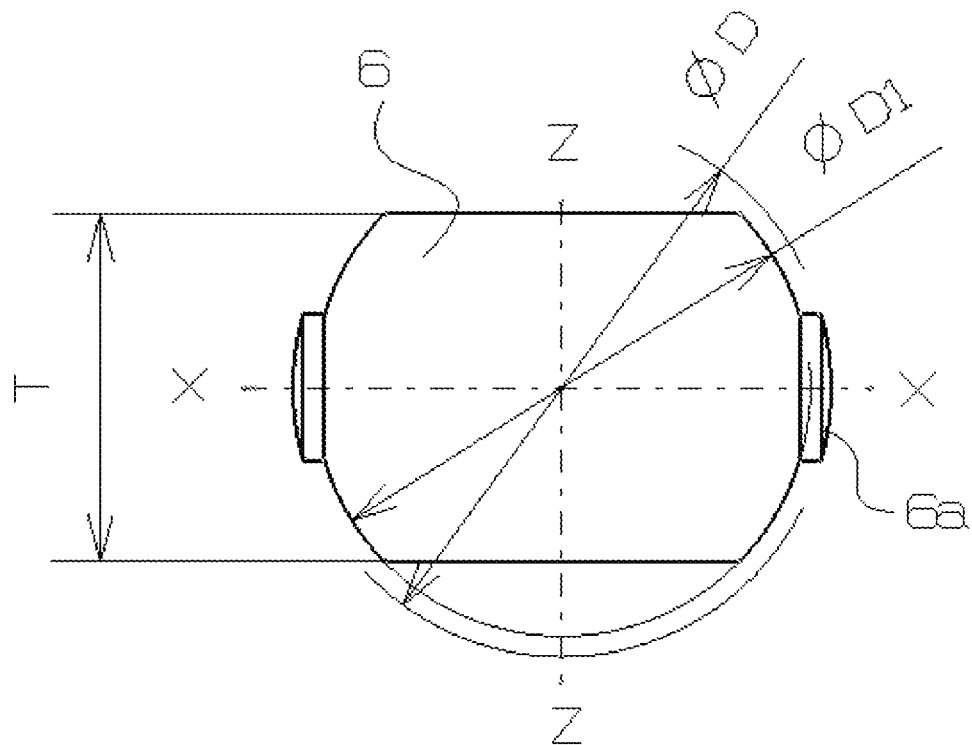
FIGS. 4(a) and 4(b) show a top view and a front view illustrating one embodiment of the trunnion disclosed in applicant's prior application Ser. No. 11/840,194 and Ser. No. 11/750,138, which are now issued as U.S. Pat. No. 7,878,914 and U.S. Pat. No. 7,819,752, respectively.
Figure 4B:
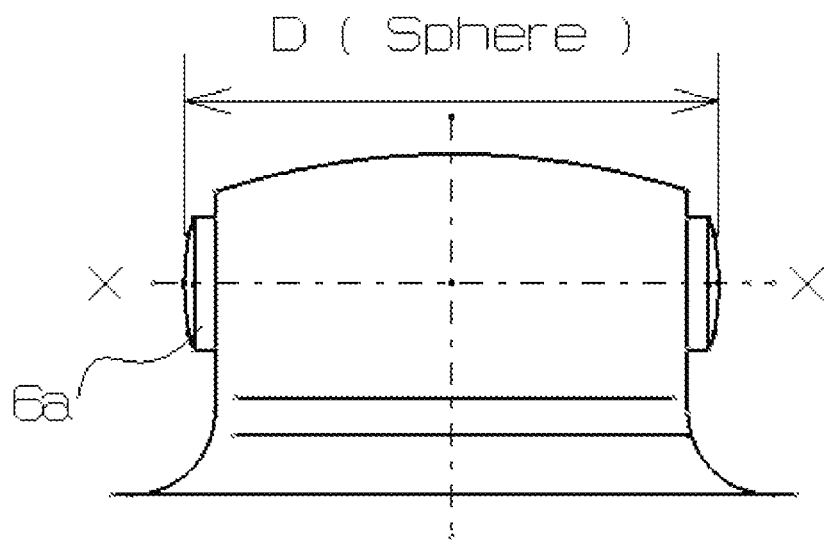

A groove 210 of circular or oval shape, recessed from the spherical surface of the trunnion, is provided at the central location of each spherical contact surface of the trunnion 206 as shown in FIGS. 5(*b*) and 5(*c*). By the groove 210, the spherical contact surface of the trunnion is divided into a main spherical contact area 206*a* in circular (as shown) or oval shape of predetermined size and a lateral spherical surface "J" outside of the central main contact area 206*a*. The lateral contact surface J has the same spherical diameter as that of the central main spherical contact surface 206*a*, and provides an additional surface for contact with the inner surface of the inner roller. Due to this additional contact surfaces, the contact surfaces of the trunnion 206 provide an enhanced mechanical strength sufficient to endure a potential high stress concentration on the contact surfaces. Alternatively, because the present invention provides more contact surfaces, the overall size (such as the spherical diameter φD and the thickness S) of each trunnion can be reduced than that of the trunnions of the applicant's prior applications, which receive the contact load only by the cylindrical protrusions 6a as illustrated in FIG. 4, while satisfying the mechanical strength requirements of the trunnions.

The circular groove 210 recessed from the spherical contact surface of the trunnion is for retaining additional grease therein to further lubricate the contact surfaces between the trunnions and the generally spherical inner surface of the inner roller, thus, further enhancing the durability of the joints under an extended and adverse operation condition. This lubrication is in addition to the main lubrication to be performed by the grease retained in the space between the inner surface of the inner race and the two opposing planar (or partially curved or angled) surfaces disposed in the directions not subjecting to the load.

Figure 6A:
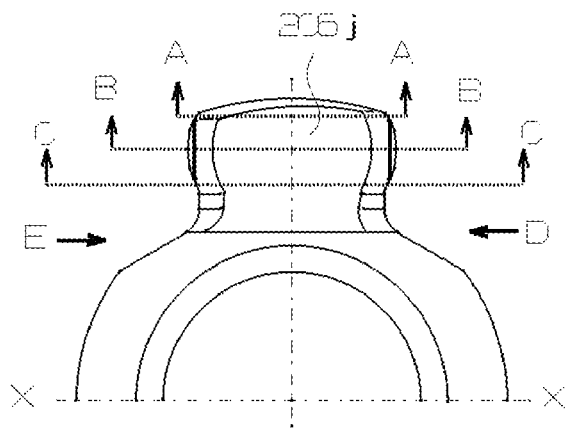
FIG. 6(a) shows a front view of the trunnion according to another preferred embodiment of the present invention.
Figure 6B:
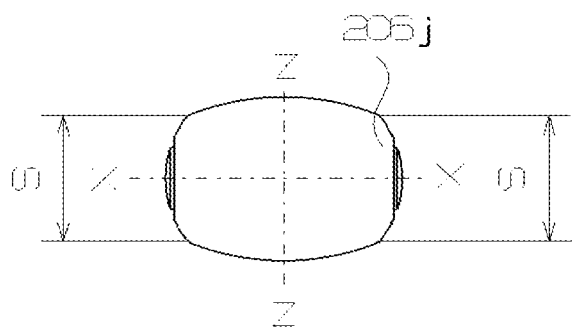
FIG. 6(b) shows a cross-sectional view of the trunnion, taken along the directions A-A, B-B, and C-C in FIG. 6(a) and illustrating the two opposing surfaces in the directions not subject to the load have a curved or convex contour.
Figure 6C:
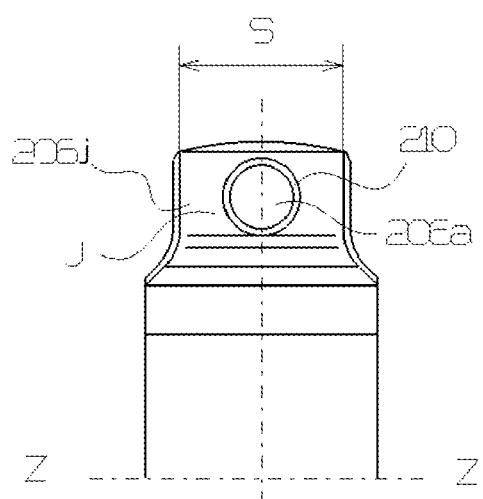
FIG. 6(c) shows a side view of the trunnion, seen from the directions D and E in FIG. 6(a)

FIG. 6 illustrates the tripod for a constant velocity joint according to another preferred embodiment of the present invention, in which FIG. 6(*a*) shows a partial front view of the tripod, FIG. 6(*b*) shows a cross-sectional view of a trunnion of the tripod, taken along the directions A-A, B-B, and C-C in FIG. 6(*a*), and FIG. 6(*c*) shows a side view of the tripod, seen from the directions D and E in FIG. 6(*a*).

With reference to FIGS. 6(*a*)-(*c*), this embodiment is similar to the embodiment of FIG. 5 described above, and the detailed descriptions to the common features thereof are omitted herein and to be referred to the description of FIG. 5 above. The main difference of this embodiment over that of FIG. 5 is that the two opposing side surfaces are shaped to a curved or convex shape having thickness S, which is the maximum non-interfering thickness to be described later or a thickness slightly (i.e., 0-30%) smaller than the maximum non-interfering thickness, at both lateral sides of the trunnion for easy assembly, however, having greater thickness at the central portions of the trunnion. Due to this convex shape, the trunnion of this embodiment has a greater mechanical strength than that of FIG. 5, thus enhancing the durability in adverse operating condition.

Figure 7A:
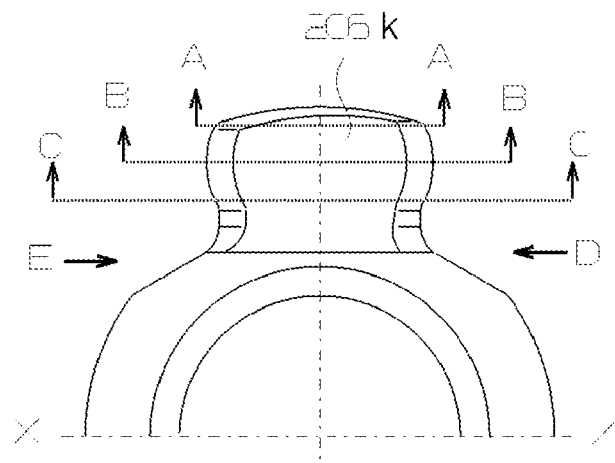
FIG. 7(a) shows a front view of the trunnion according to another preferred embodiment of the present invention, in which the trunnion does not includes of the grooves of circular or oval shape shown in FIG. 6(a)
Figure 7B:
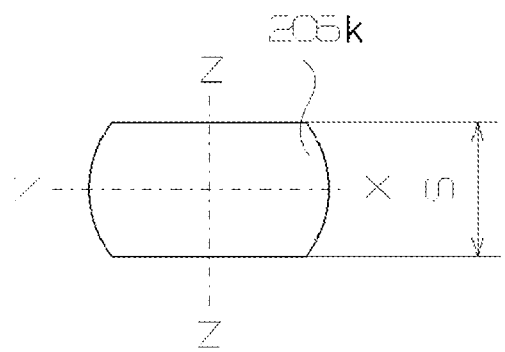
FIG. 7(b) shows a cross-sectional view of the trunnion, taken along the directions A-A, B-B, and C-C in FIG. 7(a)
Figure 7C:
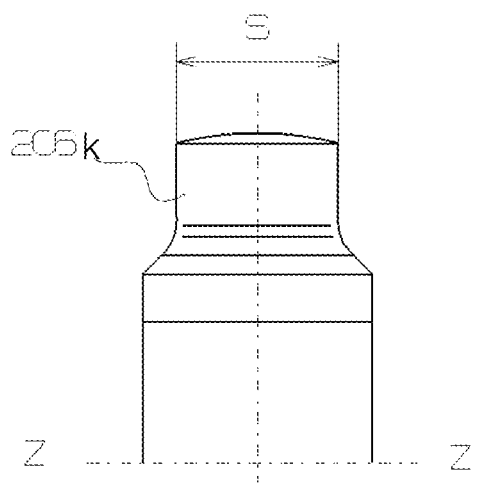
FIG. 7(c) shows a side view of the trunnion, seen from the directions D and E in FIG. 7(a)

FIG. 7 illustrates the tripod for a constant velocity joint according to another preferred embodiment of the present invention, in which FIG. 7(*a*) shows a partial front view of the tripod, FIG. 7(*b*) shows a cross-sectional view of a trunnion of the tripod, taken along the directions A-A, B-B, and C-C in FIG. 7(*a*), and FIG. 7(*c*) shows a side view of the tripod, seen from the directions D and E in FIG. 7(*a*).

With reference to FIGS. 7(*a*)-(*c*), this embodiment is similar to the embodiment of FIG. 5 described above, and the detailed descriptions to the common features thereof are omitted herein and to be referred to the description of FIG. 5 above. The main difference of this embodiment over that of FIG. 5 is that the trunnions do not include the grooves of circular or oval shape for retaining additional grease therein to further facilitate the lubrication in the contact surface between the trunnions and the inner rollers. In this embodiment, the lubrication is performed mainly by the grease retained in the space defined between the inner roller and the side flat surfaces of the trunnions.

Figure 8A:
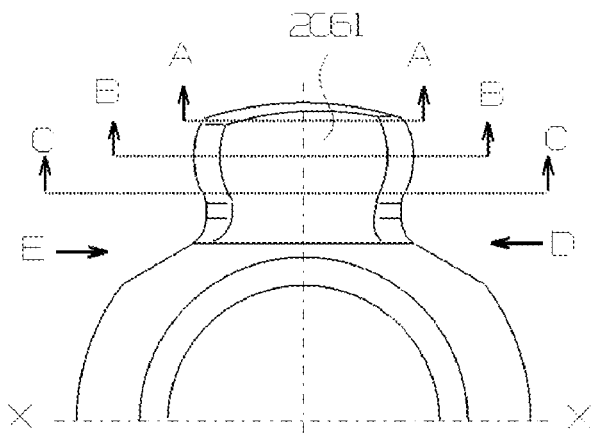
FIG. 8(a) shows a front view of the trunnion according to another preferred embodiment of the present invention, in which the trunnion does not includes of the grooves of circular or oval shape shown in FIG. 6(a)
Figure 8B:
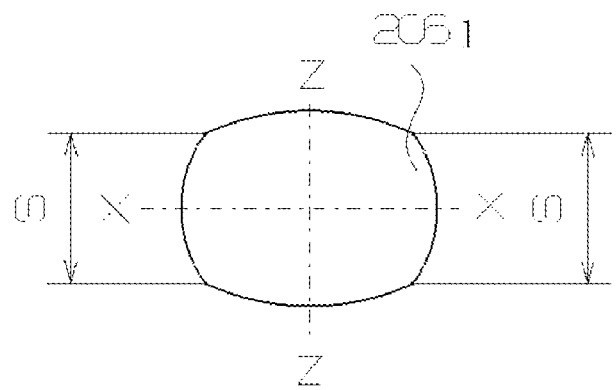
FIG. 8(b) shows a cross-sectional view of the trunnion, taken along the directions A-A, B-B, and C-C in FIG. 8(a) and illustrating the two opposing surfaces in the directions not subject to the load have a curved or convex contour.
Figure 8C:
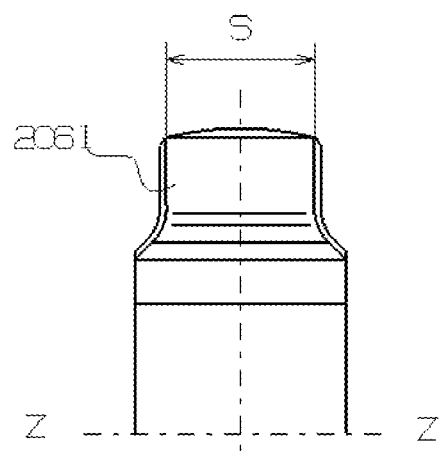
FIG. 8(c) shows a side view of the trunnion, seen from the directions D and E in FIG. 8(a)

FIG. 8 illustrates the tripod for a constant velocity joint according to another preferred embodiment of the present invention, in which FIG. 8(*a*) shows a partial front view of the tripod, FIG. 8(*b*) shows a cross-sectional view of a trunnion of the tripod, taken along the directions A-A, B-B, and C-C in FIG. 8(*a*), and FIG. 8(*c*) shows a side view of the tripod, seen from the directions D and E in FIG. 8(*a*).

With reference to FIGS. 8(*a*)-(*c*), this embodiment is similar to the embodiment of FIG. 7 described above, and the detailed descriptions to the common features thereof are omitted herein and to be referred to the description of FIG. 7 above. The main difference of this embodiment over that of FIG. 7 is that the two opposing side surfaces are shaped into a curved or convex shape having thickness S (which is the maximum non-interfering thickness or a thickness slightly smaller than the maximum non-interfering thickness) at both lateral sides of the trunnion for easy assembly, however, having greater thickness at the central portions of the trunnion. Due to this convex shape, the trunnion of this embodiment has a greater mechanical strength than that of FIG. 7, thus enhancing the durability in adverse operating condition.

Figure 14:
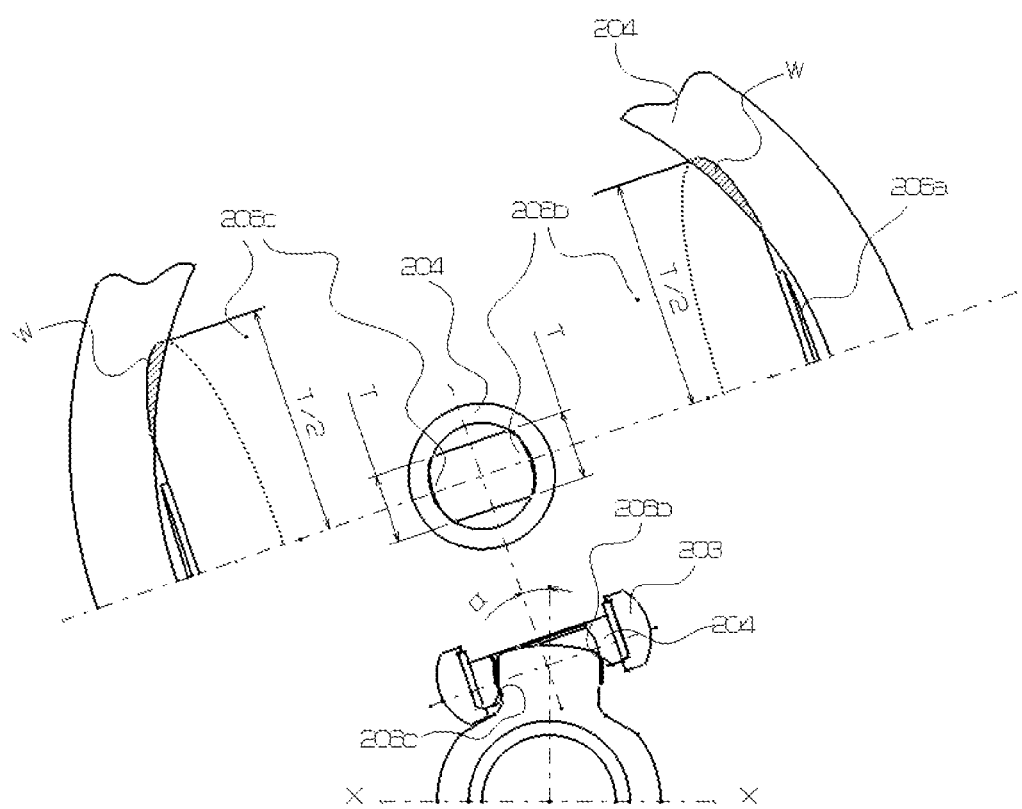
FIG. 14 shows a partial side cross-sectional view and a top view illustrating a spatial relationship between the trunnion and the inner roller with the inner roller inclined by the angle α for assembly, in which the trunnion has a thickness "T" (larger than thickness "S") at the two lateral sides thereof which include the hatched areas "W" interfering with the inner roller when assembling.

With reference to FIG. 14, described below are the underlying reasons for particularly selecting the thickness of the trunnion to include the thickness S throughout the trunnion (as in FIGS. 5 and 7) or at least one lateral side of the trunnion (as in FIGS. 6, 8, 9-10) for assembly and other considerations.

Figure 13:
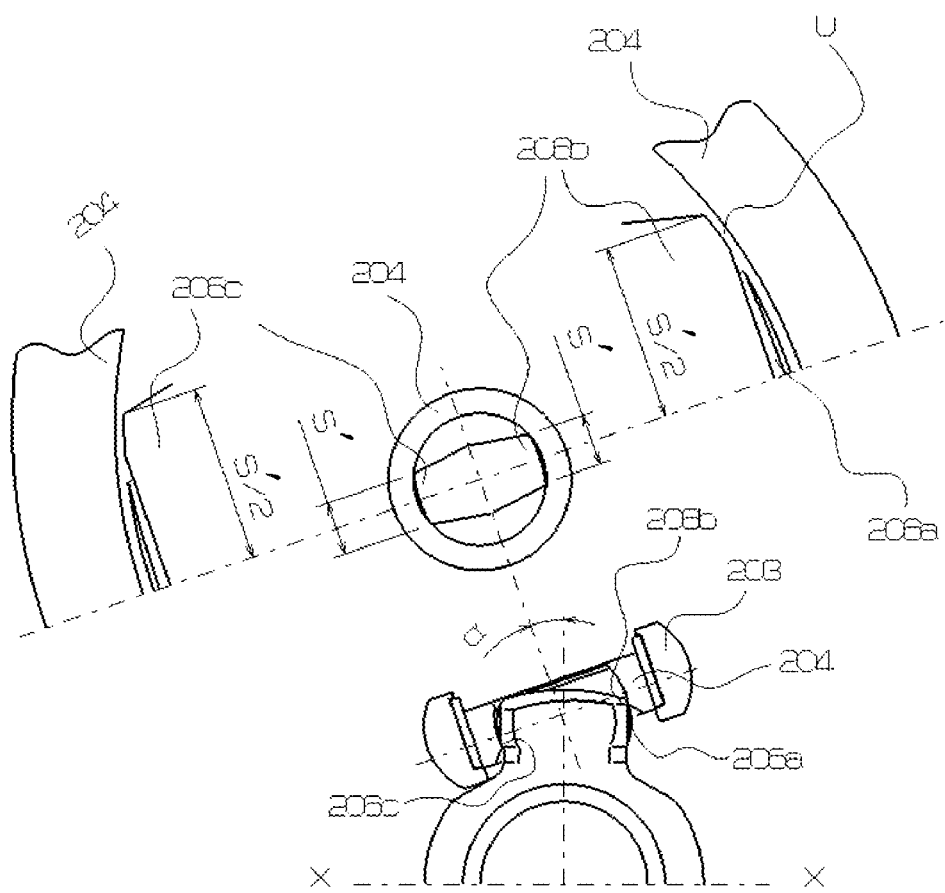
FIG. 13 shows a partial side cross-sectional view and a top view illustrating a spatial relationship between the trunnion and the inner roller with the inner roller inclined by the angle α for assembly, in which the trunnion has a thickness "S" at the two lateral sides thereof not interfering with the inner roller when assembling.

To assemble the trunnion into the inner roller 204, the roller assembly, having inner roller 204 installed within outer roller 203 with needle rollers retained therein, is tilted to assume an inclined angle α with respect to the trunnion, as illustrated in FIGS. 13 and 14. When inclined, the spherical outer surface of the trunnion 206, composed of the center contact area 206a and the lateral spherical area J, projects into an elliptical shape when viewed from the angle of the inner roller 204. As shown in FIG. 14, if the trunnion has a thickness T, which is larger than the maximum non-interfering thickness S', the elliptically-projected surface includes hatched areas W at four corners of the trunnion, where the inner roller 204 collides and interferes with the elliptical shaped trunnion for assembly.

However, if the trunnion has a thickness S' (the maximum non-interfering thickness), as shown in FIGS. 5-8 and 13, or a thickness slightly smaller than S', the inner roller 204 does not interfere with the elliptically projected outer surface of the trunnion for assembly. For this reason, it is crucial to have the thickness S' or smaller size at one or both lateral sides of the trunnion.

As such, the thickness of trunnion is typically to be reduced from "T" to "S" (as shown in FIG. 5) in order to assemble the trunnion into the inner roller without interference. However, when the entire thickness of the trunnion is reduced to the thickness S, the cross-sectional dimension of the neck of the trunnion (defined between the trunnion and the shoulder there-below) is also to be reduced to meet the design requirements and assembly considerations of the tripod. As a result, when the dimension of the neck portion is reduced, the trunnion may have an insufficient bending strength particularly around the neck of the trunnion. Accordingly, one solution to this strength deterioration problem in the neck portion is to have the trunnion into a convex cross-sectional shape of enhanced dimension as shown in FIGS. 6 and 8. When having the convex-shaped trunnion, the neck portion of the trunnion can be enlarged and the mechanical strength in the neck of the trunnion can be enhanced.

Moreover, as detailed below, the applicant of this invention further recognized another potential drawback in the embodiments of the invention described above in connection with FIGS. 5-8, which have the thickness S at both lateral sides of the trunnion to contact the inner surface of the inner roller. That is, by having the smaller thickness S at both lateral sides of the trunnion 206 (e.g., 206i, 206j, 206k, and 206l shown in FIGS. 5-8), the spherical contact surface between the inner roller and the trunnion is also reduced. As a result, the maximum load to be supported by the trunnion and the inner roller is limited, and thus, weakening the durability of the system. Accordingly, with reference to FIGS. 9-11, the applicant further provides the following solutions to this and above described drawbacks, while also satisfying the assembly considerations of the tripod system.

Figure 9A:
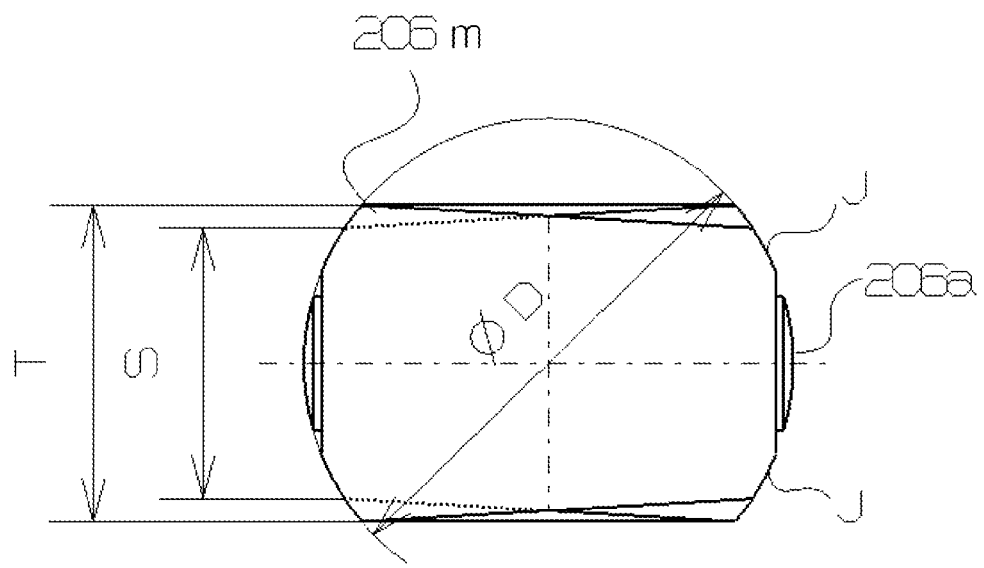
FIGS. 9(a) and 9(b) show a top view and a partial front side view of the trunnion according to another preferred embodiment of the present invention, in which the two opposing surfaces in the directions perpendicular to the spherical surfaces have a cross-sectional shape, taken in a direction perpendicular to the trunnion shaft, which has a width or thickness alternately varying between the lower and upper portions of the trunnion.
Figure 9B:
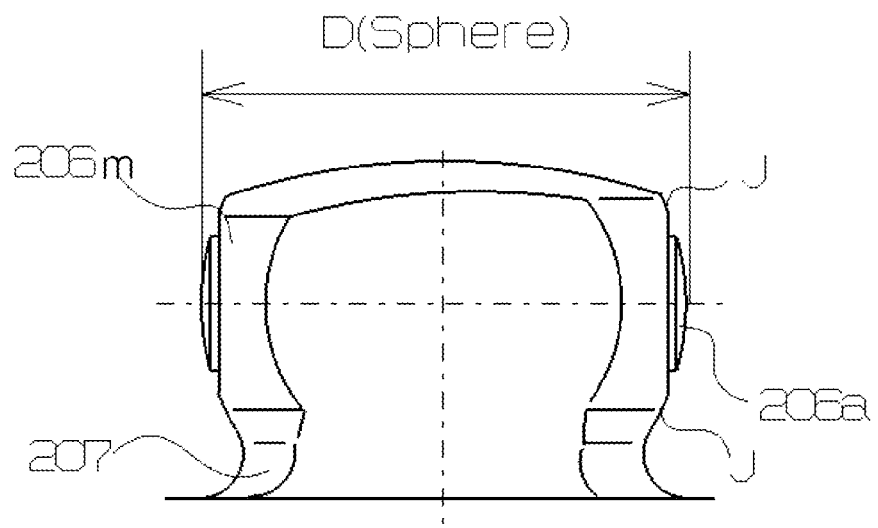
Figure 10A:
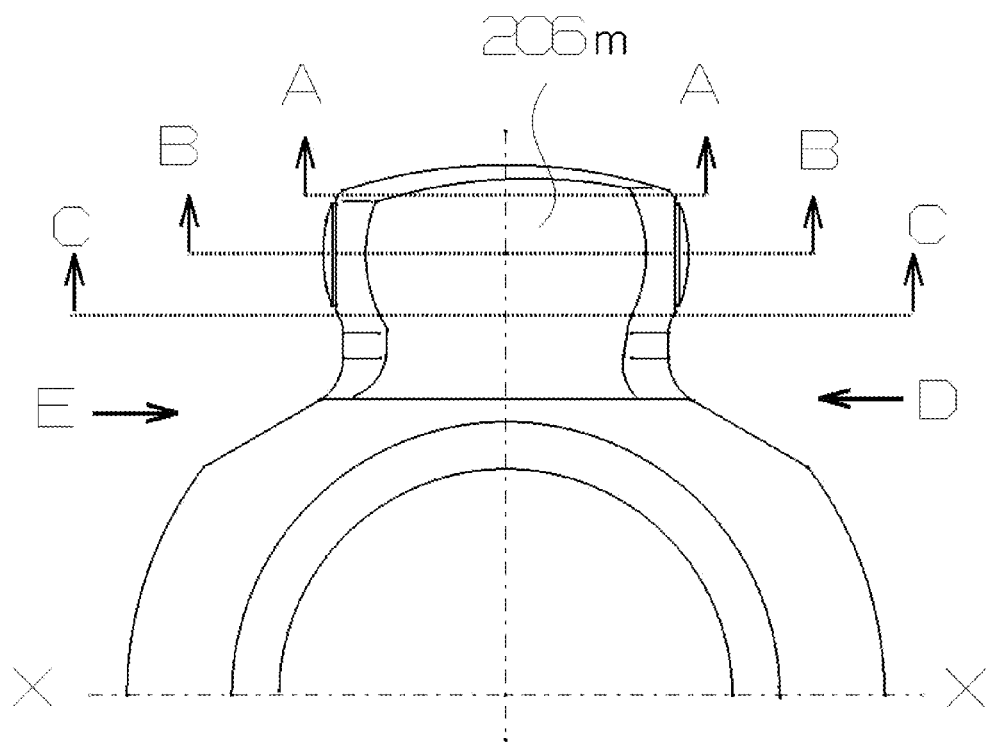
FIG. 10(a) shows a partial front view of the tripod having the trunnion of FIG. 9.
Figure 10B:
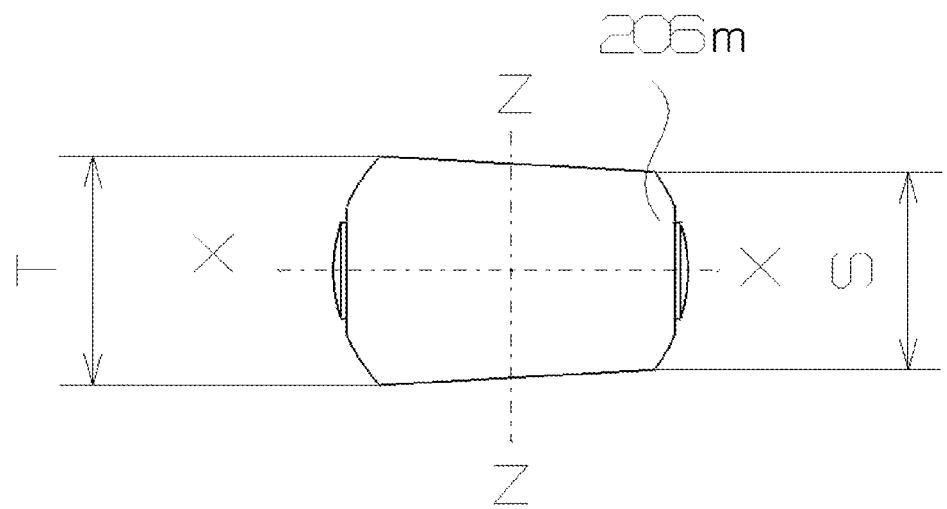
FIG. 10(b) is a top cross-sectional view of the trunnion taken along the line A-A in FIG. 10(a)
Figure 10C:
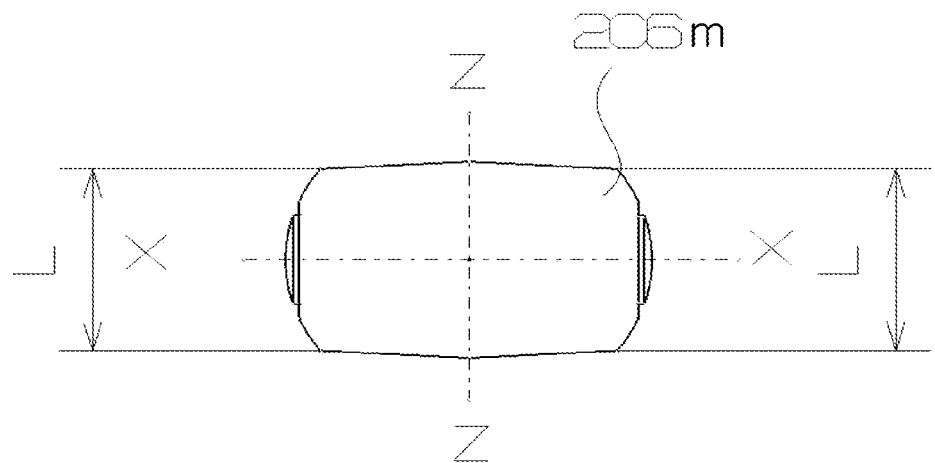
FIG. 10(c) is a top cross-sectional view of the trunnion taken along the line B-B in FIG. 10(a)
Figure 10D:
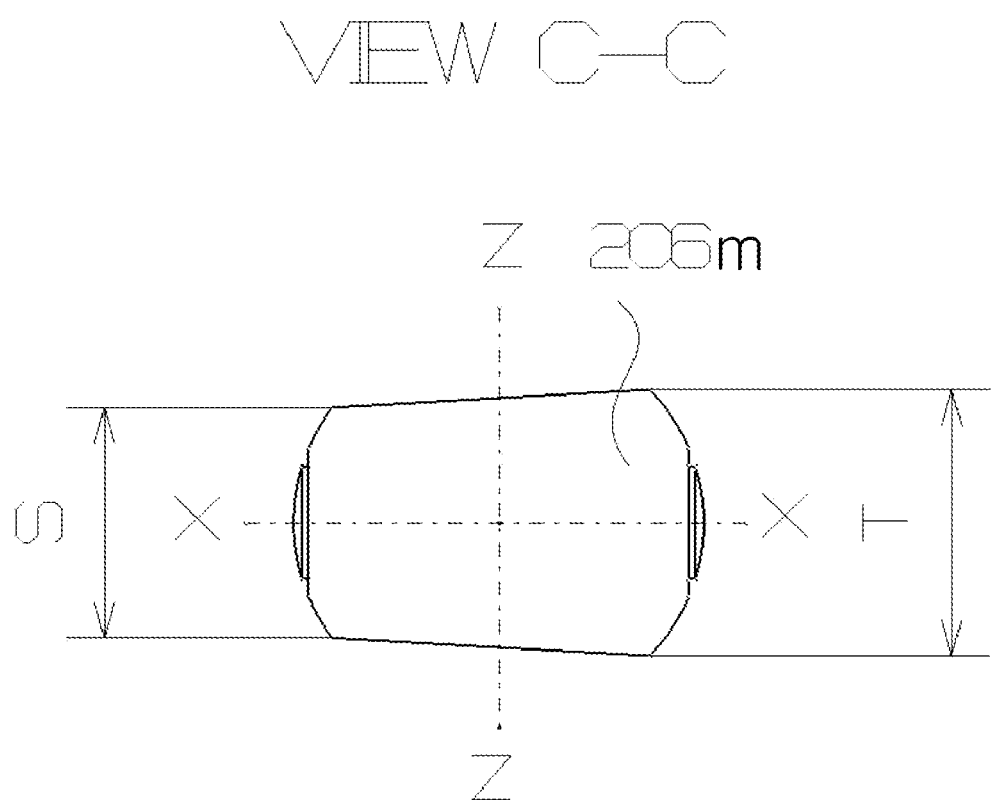
FIG. 10(d) is a top cross-sectional view of the trunnion taken along the line C-C in FIG. 10(a)
Figure 10E:
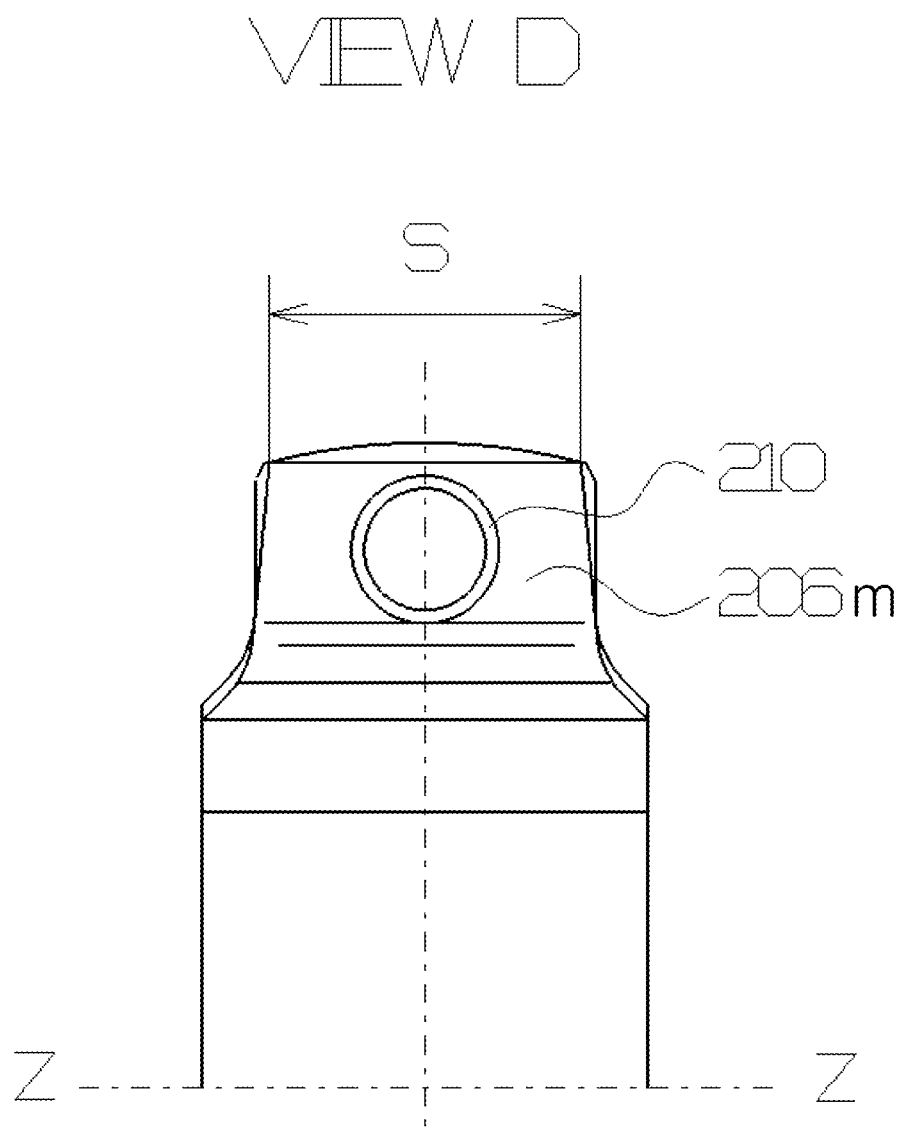
FIG. 10(e) is a right side view shown from the direction "D" in FIG. 10(a)
Figure 10F:
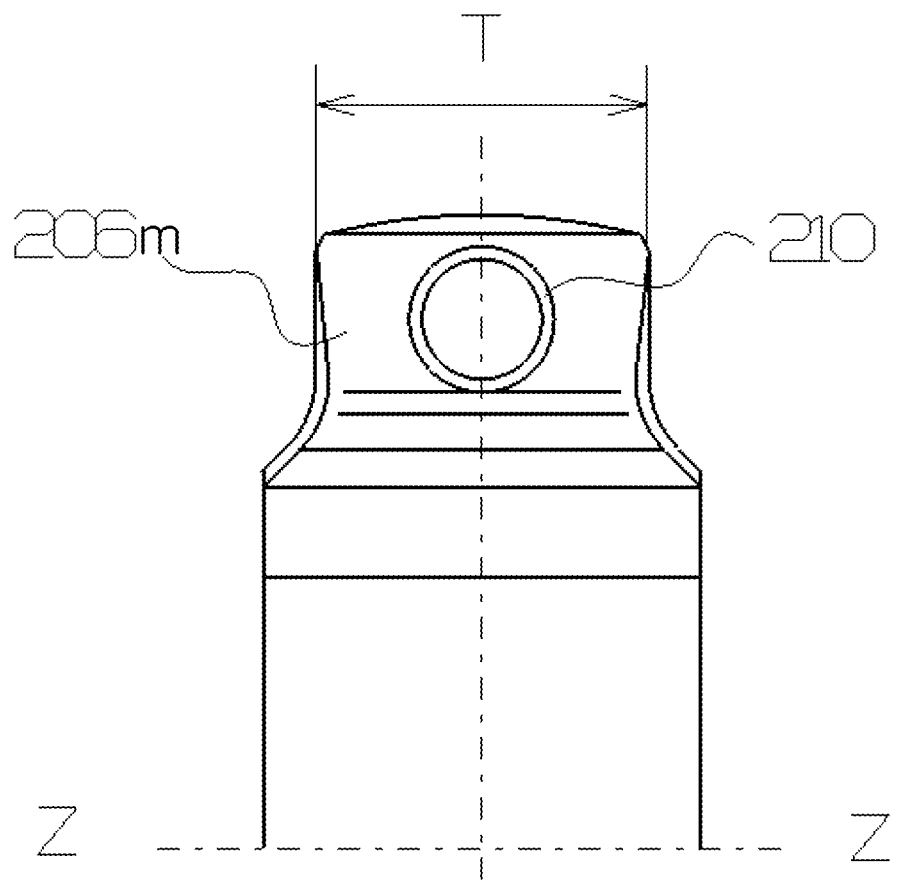
FIG. 10(*f*) is a left side view shown from the direction "E" in FIG. 10(*a*)
Figure 11:
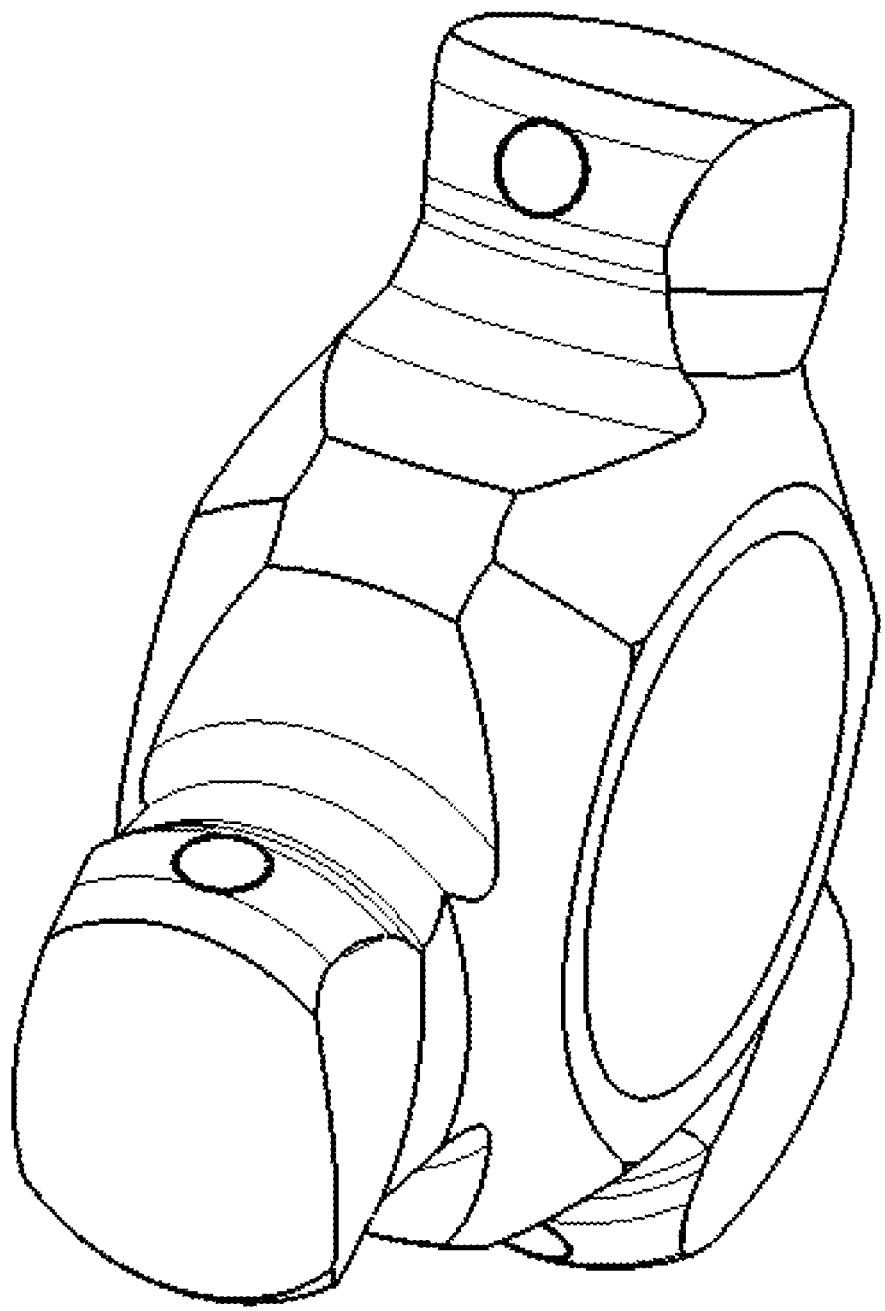
FIG. 11 is a side prospective view illustrating the tripod of FIG. 10(*a*)

With reference to FIGS. 9-11, the trunnion 206m has a complex shape with its cross-sectional dimension gradually varying between T and S, preferably in an alternating manner, relative to the axial coordinate distance from the neck or center of the trunnion, while satisfying the assembly consideration discussed above and further enhancing the mechanical strength and durability of the trunnion.

More particularly, in order to secure more contact surface to the trunnion 206 and also to provide a sufficient bending strength to the neck portion 207, the cross-sectional shape taken at the upper portion of the trunnion has a larger thickness "T" at one side (e.g., the left side) and is gradually decreased until it reaches a smaller thickness "S" at the opposite side (e.g., the right side) of the trunnion, as shown in FIG. 10(b). To the contrary, the cross-sectional shape taken at the lower portion of the trunnion has an opposing or generally symmetrical shape with a smaller thickness "S" at the left side and the thickness is gradually increased until it reaches a larger thickness "T" at the right side of the trunnion, as shown in FIG. 10(d). The cross-sectional shapes in-between the upper and lower portions are gradually and continuously varied from the cross-sectional shape at the upper portion to the cross-sectional shape at the lower portion of the trunnion. As a result, the cross-sectional shape taken at the middle portion of the trunnion includes a generally planar shape or a slightly convex shape, as shown in FIG. 10(c), with the side thickness "L" having a dimension between "T" and "S".

The dimensions of S and T can be determined in the range defined by the following equations:

$$0.5D \leq S \leq 0.7D;$$

$$1.0S \leq T \leq 1.2S;$$

wherein D is the spherical diameter of the trunnion.

Referring still to FIGS. 9-11, this embodiment includes members and features common with that of the embodiments shown in FIGS. 5 and 6 described above. The detailed descriptions of such common features (for example, such as groove 210, main spherical contact area 206a, and lateral spherical contact area J) are omitted herein and to be referred to the description of FIG. 5 above.

Preferred assembly methods of the constant velocity joint of the present invention are described herein below in connection with only the embodiment of FIGS. 9-11. Assembly methods for other embodiments of the invention before described would be based on similar concepts and methods described herein. Accordingly, those skilled in the art will appreciate or recognize that various modifications and substitutions can be made thereto without departing from the spirit, concepts, and aspects of the assembly methods described below.

Figure 12A:
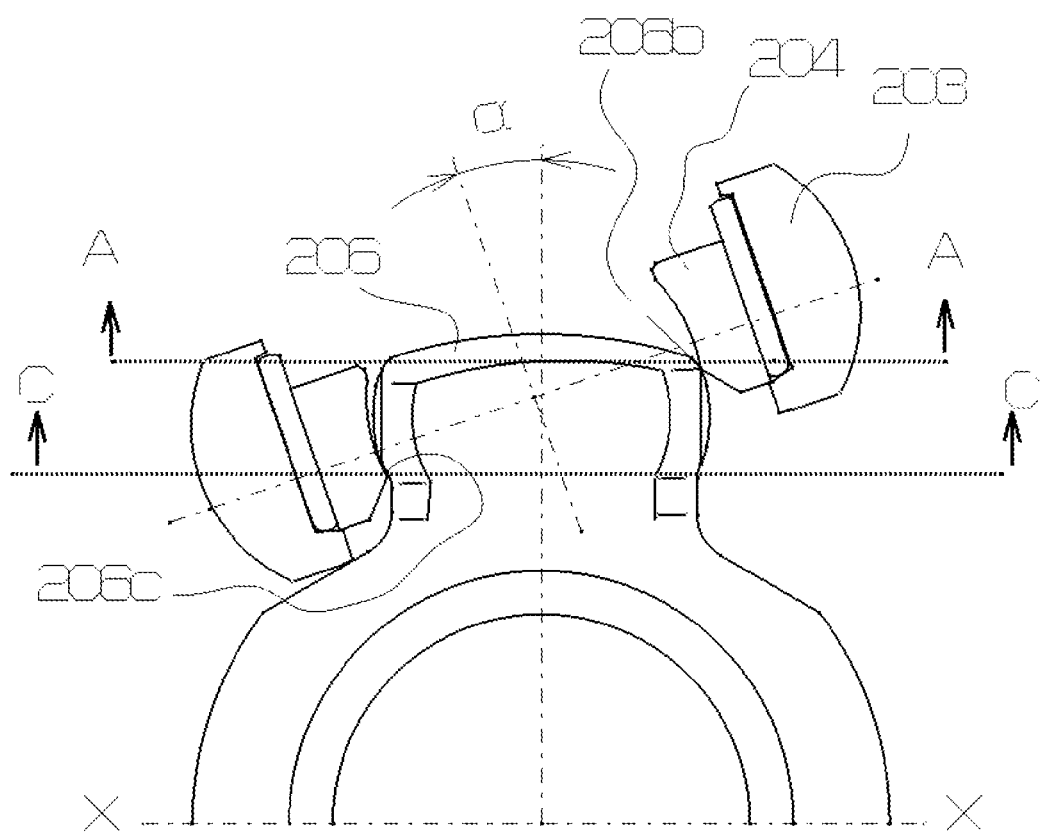
FIG. 12(*a*) is a partial side cross-sectional view illustrating a spatial relationship between the trunnion and the inner roller with the inner roller inclined by the angle α for assembly.
Figure 12B:
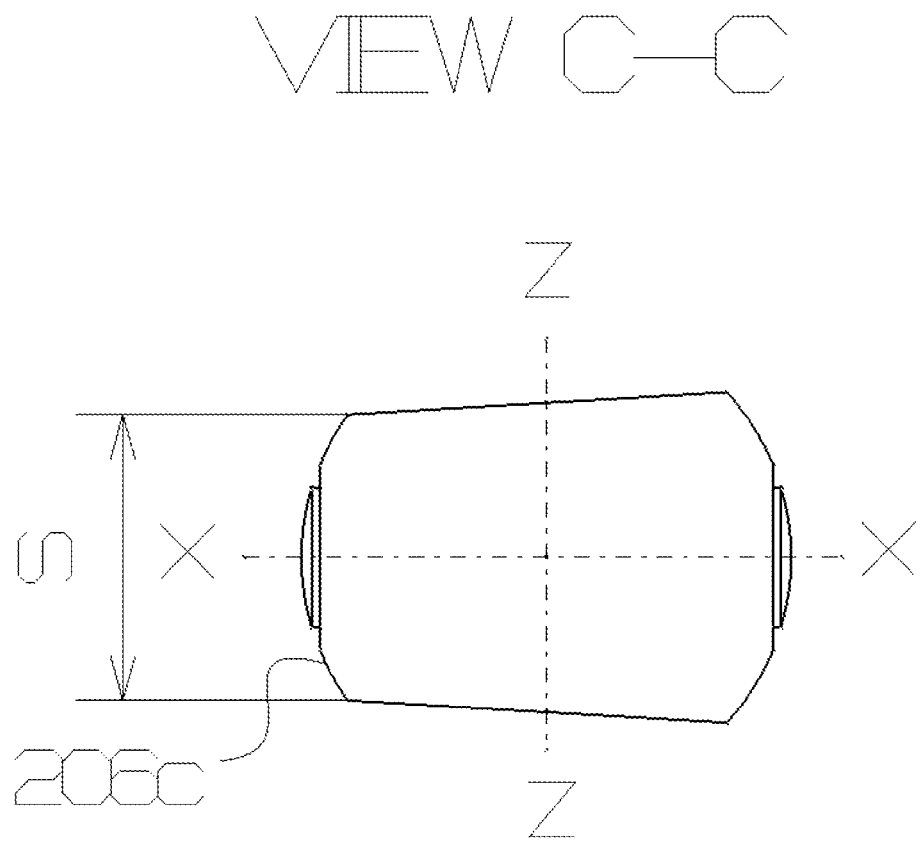
Figure 12C:
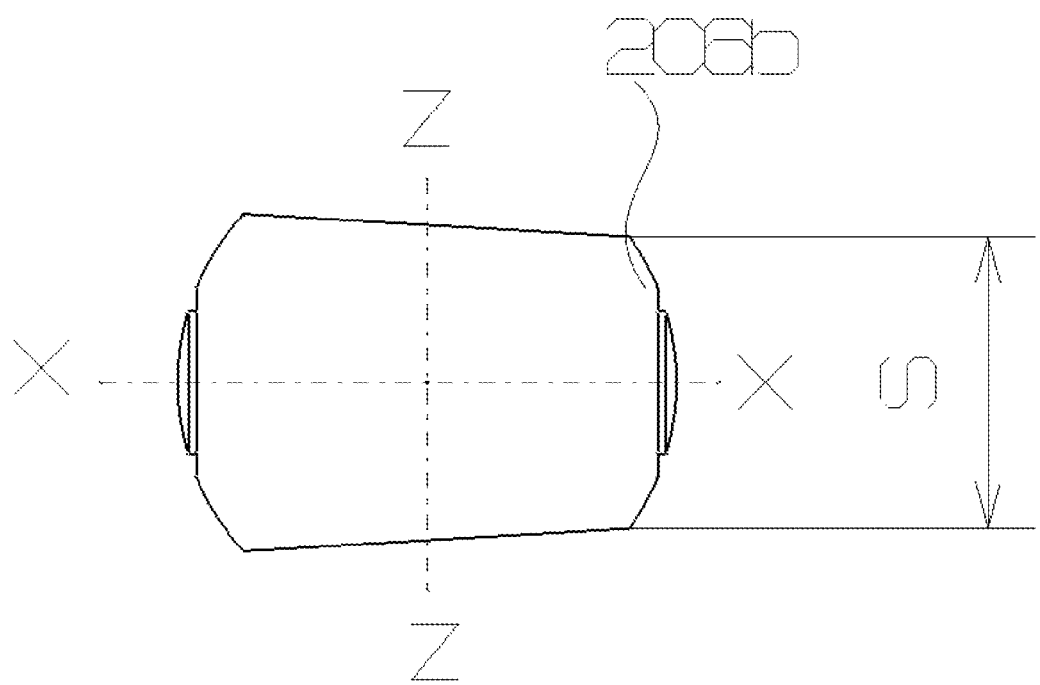

With reference to FIG. 12(a), the roller assembly having the inner roller 204 received in the outer roller 203 is tilted to assume an inclination degree α relative to the axis of the trunnion 206. Then, one lower side (e.g., the lower right side) of the inner roller 204 of the roller assembly is placed on one upper side (e.g., the upper right side 206b) of the trunnion, and the other lower side (e.g., the lower left side) of the inner roller 204 is positioned into the trunnion 206 to meet the corresponding lower side (e.g., the lower left side 206c) of the trunnion as shown. By this arrangement, because both the upper right side 206b and the lower left side 206c of the trunnion have spherical contact surfaces with the smaller thickness S as shown in FIG. 12(c) and FIG. 12(b), respectively, the inner roller 204 can be easily assembled onto the trunnion 206 by suitably rotating the inner roller 204 about the spherical contact surface of the trunnion with the lower left side 206c of the trunnion using as a pivot center for the inner roller 204. This assembly can be performed without any interference between the parts or without applying excessive external force for assembly. This assembly method of the invention is illustrated in FIG. 13. To the contrary, FIG. 14 illustrates an opposite example in which the trunnion has the larger thickness T at both corresponding assembly sides thereof, and interferes with the inner roller 204 by the hatched regions W.

Figure 15A:
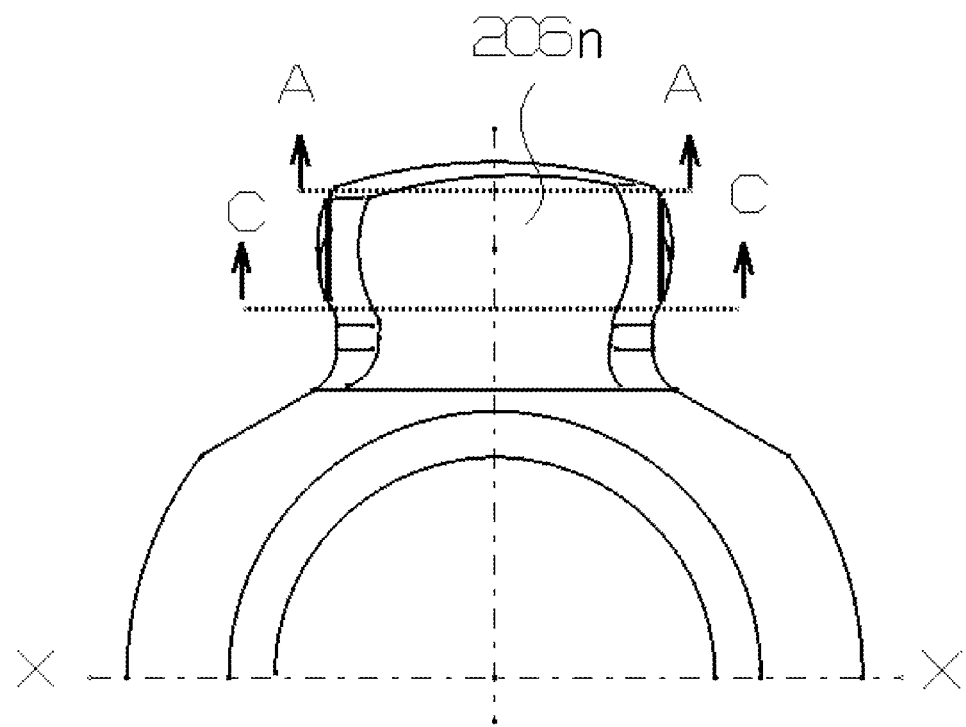
FIG. 15(*a*) is a partial side cross-sectional view of the trunnion according to one preferred embodiment of the invention, the cross-sectional shape of the trunnion having a composite and varying thickness between T and S in order to avoid the interference as illustrated in FIG. 14.
Figure 15B:
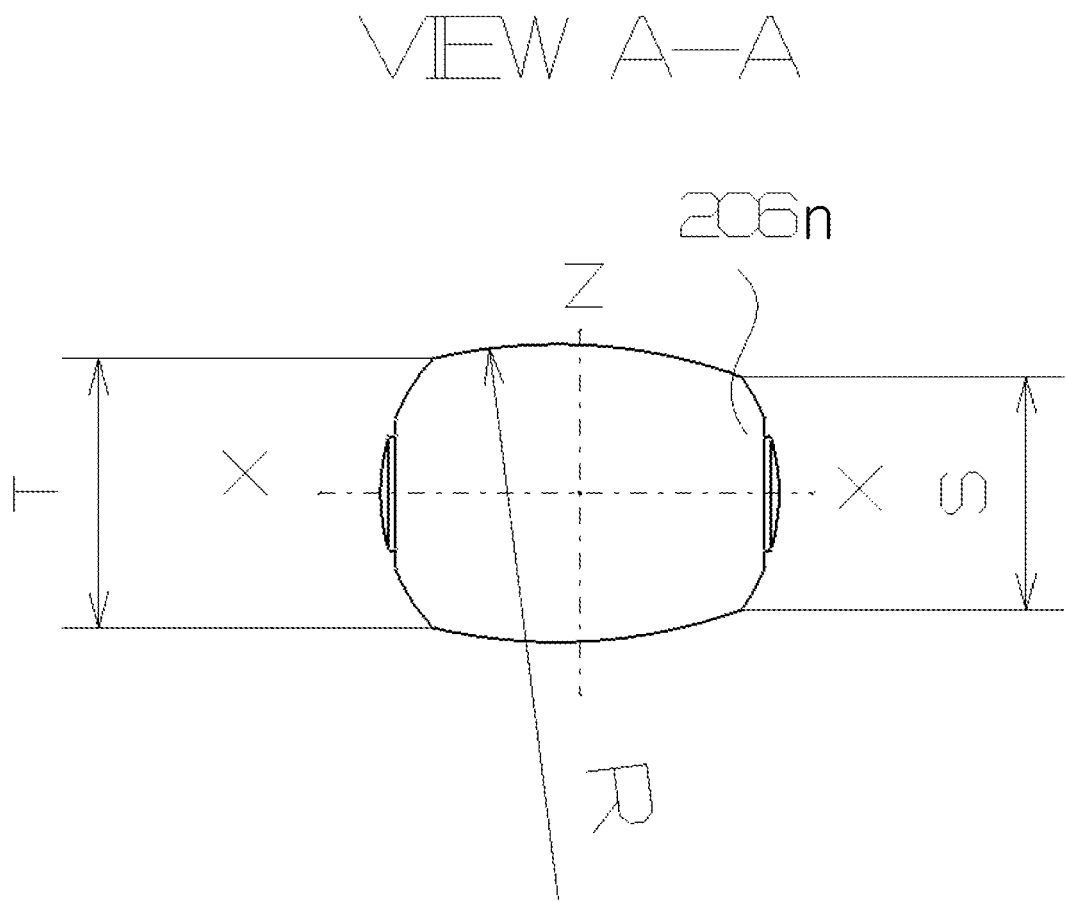
Figure 15C:
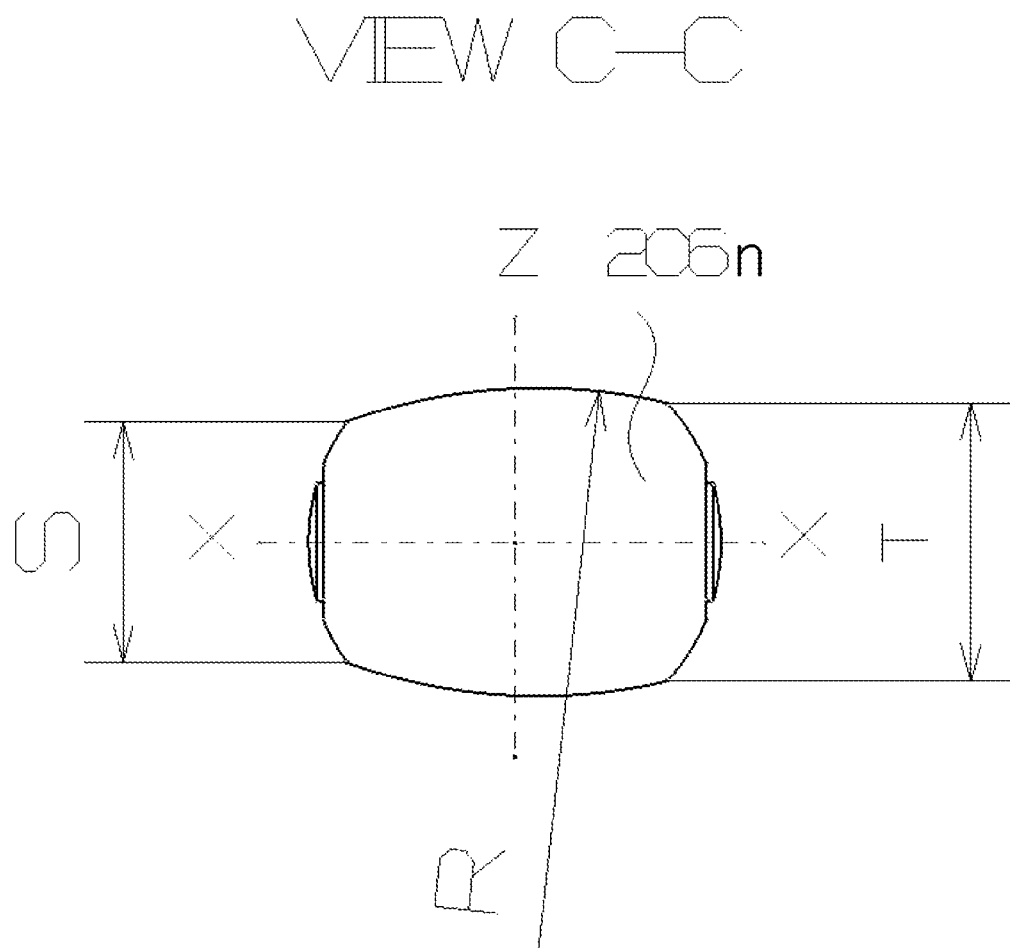

With reference to FIGS. 15(a)-(c), another preferred embodiment of the present invention is described herein. In this embodiment, in order to secure more contact surface to the trunnion 206n and also to provide a sufficient bending strength to the neck portion 207, the cross sectional shape of the trunnion has a complex shape with its thickness in cross section preferably varying relative to the axial coordinate distance from the neck or center of the trunnion in an alternating manner. In this embodiment, the cross-sectional shape taken at the upper portion of the trunnion has the larger thickness "T" at one side (e.g., the left side) and the smaller thickness "S" at the opposite side (e.g., the right side) of the trunnion, and the cross-sectional contour between the left and right sides is gradually varied to define a convex shape as a whole, preferably with the contour thereof defined by a surface radius R, as shown in FIG. 15(b). To the contrary, the cross-sectional shape taken at the lower portion of the trunnion has the smaller thickness "S" at the left side and the larger thickness "T" at the right side, and the cross-sectional contour between the left and right sides is gradually varied to define a convex shape as a whole, preferably with the contour thereof defined by a surface radius R, as shown in FIG. 15(c). The cross-sectional shapes in-between the upper and lower portions are gradually varied from the cross-sectional shape at the upper portion to the cross-sectional shape at the lower portion of the trunnion. As a result, the cross-sectional shape taken at the middle portion of the trunnion (not shown) includes a generally planar shape or a slightly convex shape, with the two lateral side thickness having a dimension between "T" and "S". Other aspects of this embodiment (including the assembly methods thereof) are similar to that of the previous embodiment of FIGS. 9-11, and the detailed descriptions to such common aspects are omitted herein and to be referred to the description of FIGS. 9-11 above.

In this embodiment, the dimensions of S, T, and R can be determined in the range defined by the following equations:

$$0.5D \leq S \leq 0.7D;$$

$$1.0S \leq T \leq 1.2S;$$

$$0.8D \leq R \leq 1.5D;$$

wherein D is the spherical diameter of the trunnion, and R is the radius of the side surfaces of the trunnion appeared in the cross sections at the upper and lower portions the trunnion.

Figure 16A:
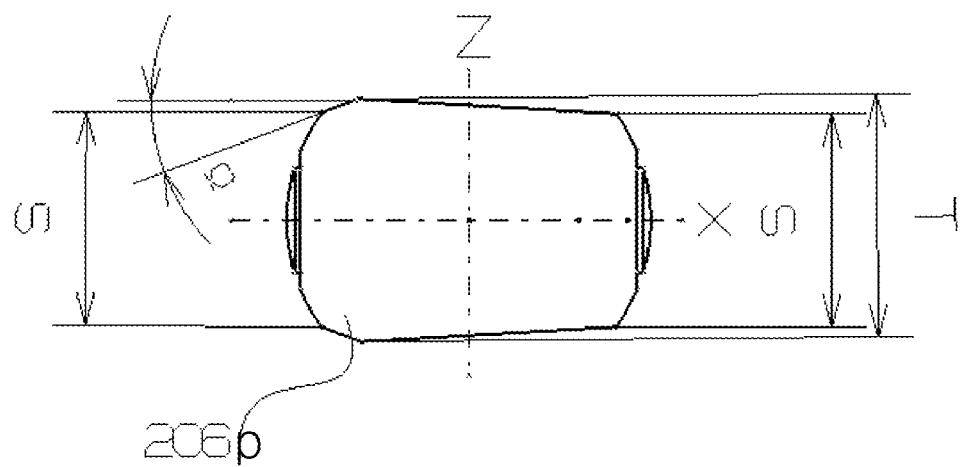
FIGS. 16(*a*) and 16(*b*) show partial side cross-sectional view and top view of the trunnion according to another preferred embodiment of the invention, the cross-sectional shape of the trunnion having a thickness varying between T and S and side chamfered areas in order to avoid the interference as illustrated in FIG. 14.
Figure 16B:
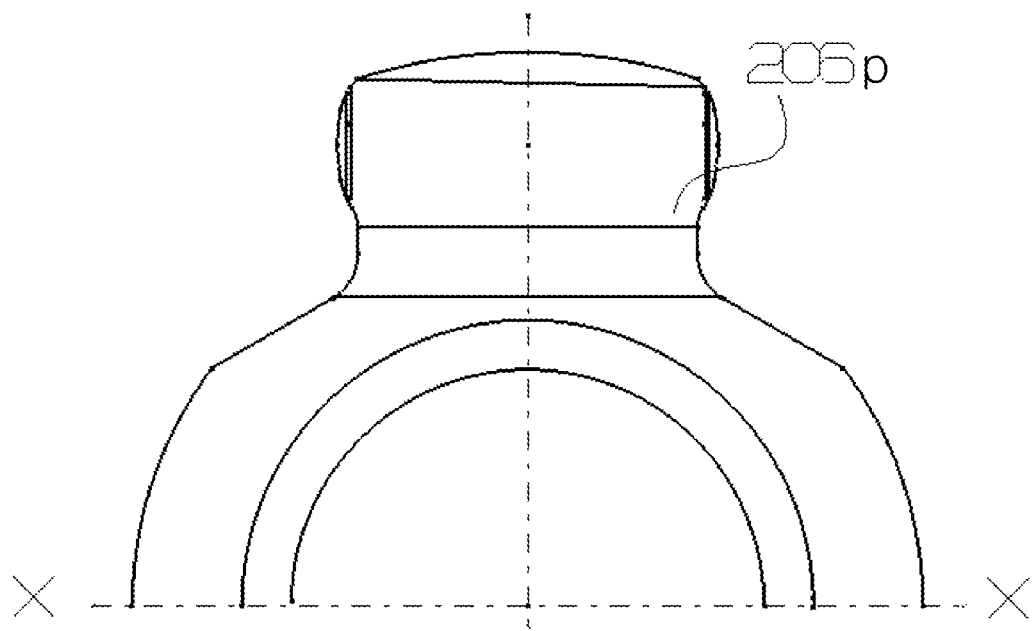

With reference to FIG. 16, another preferred embodiment of the present invention is described herein. This embodiment is similar to the embodiment of FIG. 6 described above, and the detailed descriptions to the common features thereof are omitted herein and to be referred to the description of FIG. 6 above. The main difference of this embodiment over that of FIG. 6 is that the two opposing side surfaces are shaped to an angled shape (instead of a curved or convex shape) and having the thickness S at both lateral sides of the trunnion for easy assembly, however, having an enlarged angled portion in-between the two lateral sides with chamfer Ω defined by the angled surface, as shown in the drawing. Due to the enlarged portion, the trunnion of this embodiment has a greater mechanical strength than that of FIG. 5, and thus, enhancing the durability of the trunnion.

Figure 17A:
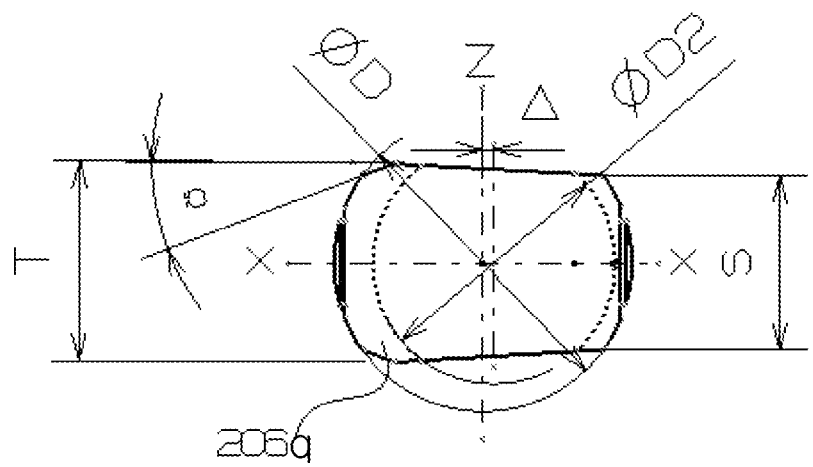
FIGS. 17(*a*) and 17(*b*) show partial side cross-sectional view and top view of the trunnion according to another preferred embodiment of the invention, in which the center of trunnion neck is offset by a distance Δ from the center of the tripod in order to avoid the assembly interference as illustrated in FIG. 14.
Figure 17B:
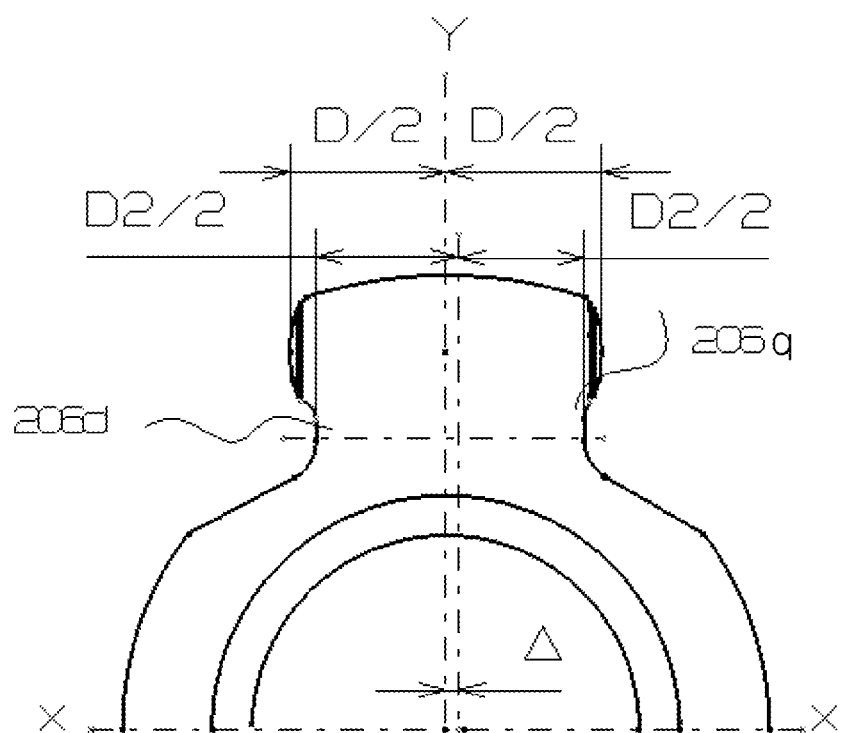

With reference to FIG. 17, another preferred embodiment of the present invention is described herein. This embodiment is similar to the embodiment of FIG. 16 described above, and the detailed descriptions to the common features thereof are omitted herein and to be referred to the description of FIG. 16 above. The main difference of this embodiment over that of FIG. 16 is that the center of the trunnion neck 206d is offset from the center (Y-Y) of the trunnion 206 by a distance of Δ, as shown in FIG. 17. Having the offset neck 206d, the assembly of the trunnion 206 into the inner roller is further facilitated. For assembly, the roller assembly (having the inner roller 204 received in the outer roller 204 with needle bearings there-between) is first tilted to assume an inclination degree α relative to the axis of the trunnion 206. Then, one lower side (e.g., the lower right side) of the inner roller 204 of the roller assembly is placed on one upper side (e.g., the upper right side 206b) of the trunnion, and the other lower side (e.g., the lower left side) of the inner roller 204 is positioned into the trunnion 206 to meet the corresponding lower side (e.g., the lower left side 206c) of the trunnion, where the thinner neck portion 206d is present by the offset of the neck, as illustrated in FIG. 18(d). By this arrangement, because both the upper right side 206b and the lower left side 206c of the trunnion, respectively, have the smaller thickness S (as shown in FIG. 17) and also due to the smaller neck portion 206d, the inner roller 204 can be easily assembled onto the trunnion 206 by suitably rotating the inner roller 204 about the spherical contact surface of the trunnion with the lower left side 206c of the trunnion using as a pivot center for the inner roller 204. This assembly can be performed without any interference between the parts and without applying excessive external force for assembly.

Figure 18A:
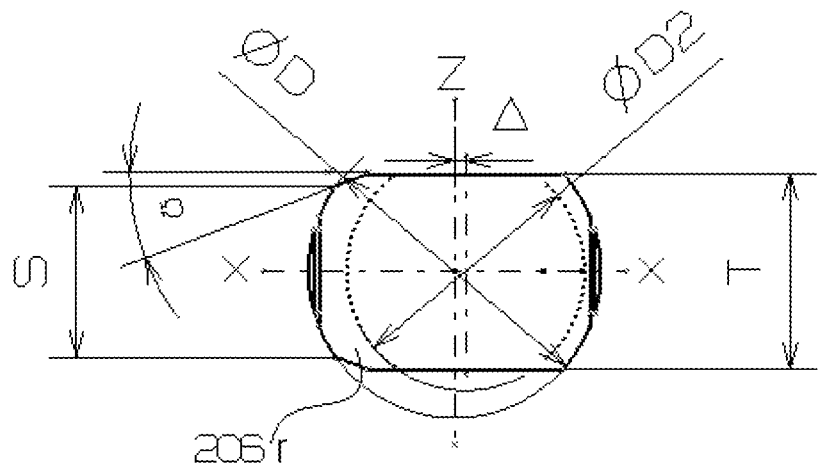
FIGS. 18(*a*)-18(*d*) illustrate another preferred embodiment of the invention similar to the embodiment shown in FIG. 17; in which the center of trunnion neck is offset by a distance Δ from the center of the tripod, however with a cross-sectional shape of the trunnion different from that of FIG. 17 as shown in FIGS. 18(*a*) and 18(*b*), and with the inner roller having two lower grooves of small size at one side of the inner roller as shown in FIG. 18(*c*) or one lower groove of bigger size at one side of the inner roller as shown in FIG. 18(*d*), provided in order to avoid the assembly interference as illustrated in FIG. 14.
Figure 18B:
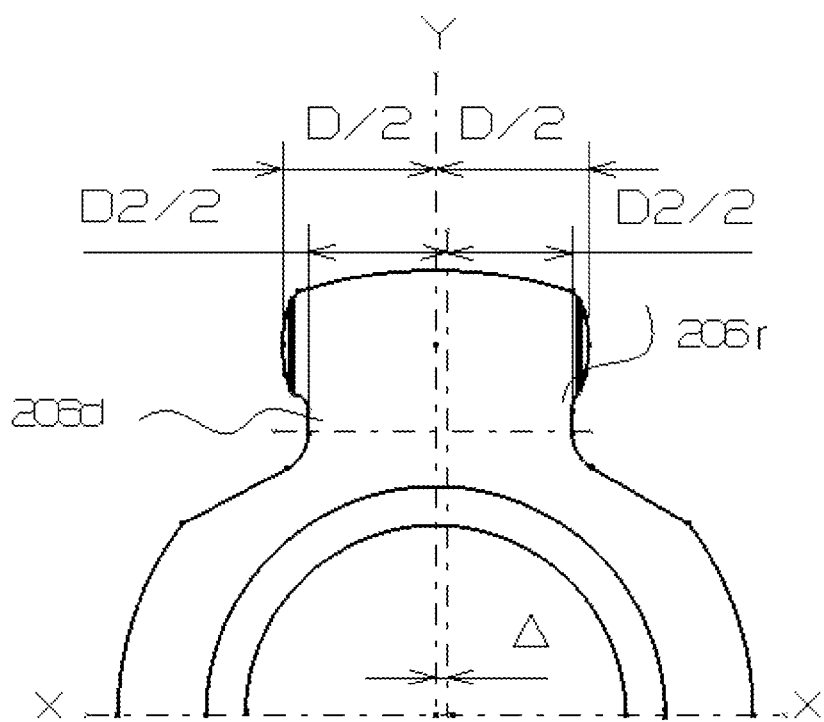
Figure 18E:
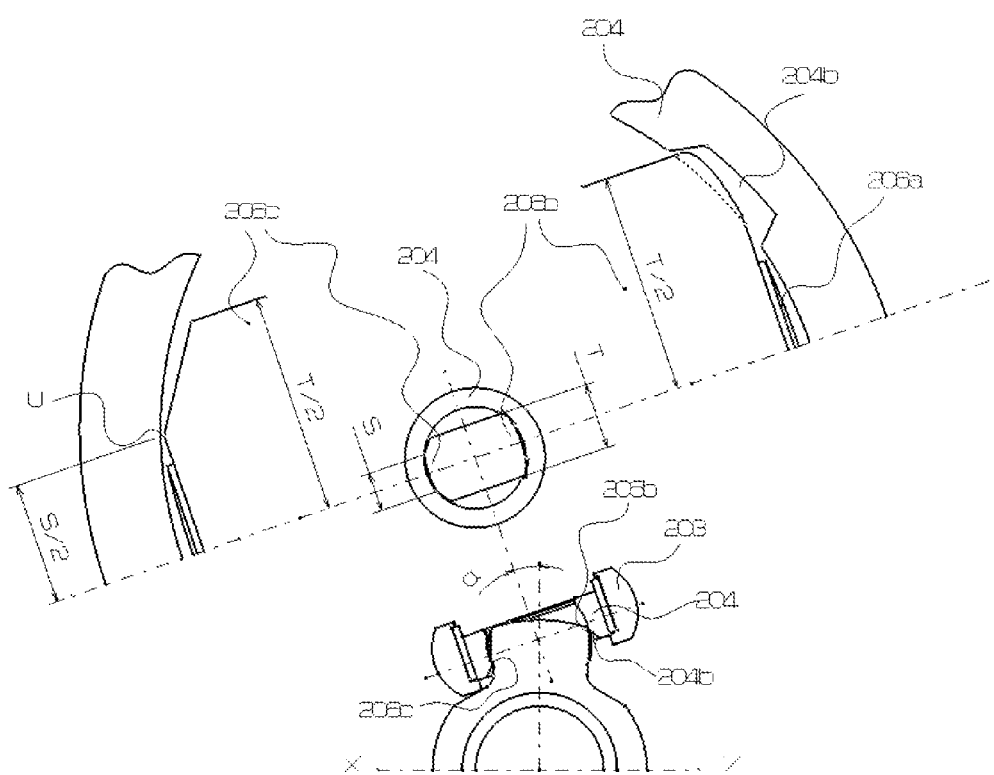

With reference to FIG. 18, another preferred embodiment of the present invention is described herein. As is similar to the embodiment of FIG. 17 described above, in this embodiment the center of the trunnion neck 206d is also offset from the center (Y-Y) of the trunnion 206 by a distance of Δ, as shown in FIG. 18(a). The main difference of this embodiment over that of FIG. 17 is that the thickness of the trunnion at one lateral side, in a direction of receiving the load, is "T", and the inner roller 204 further includes two small grooves 204b or one large groove 204b at the lower inner surface thereof, as respectively shown in FIGS. 18(b) and 18(c).

In this embodiment, although the trunnion has a larger thickness T at one lateral side subjecting to the load, the assembly can be easily done utilizing the offset neck 206d along with the lower grooves 204b of the inner roller. For assembly, the roller assembly having the inner roller 204 received in the outer roller 204 is first tilted to assume an inclination degree α relative to the axis of the trunnion 206. Then, one lower side face (e.g., the lower right side) of the inner roller 204 of the roller assembly is placed on one upper side (e.g., the upper right side 206b) of the trunnion, and the other lower side (e.g., the lower left side) of the inner roller 204 is positioned into the trunnion 206 to meet the corresponding lower side (e.g., the lower left side 206c) of the trunnion, where the smaller neck portion 206d is present by the neck offset, as illustrated in FIG. 18(d). Here, the potential interference by the larger thickness T of the trunnion, is assumed by the grooves 204b, namely, by placing the upper right edges of the trunnion in the grooves 204b of the inner roller as shown in the drawing. Thereafter, the remaining assembly processes are completed in a similar manner described above, without any interference between the parts and without applying excessive external force for assembly.

As described above in association with various exemplary embodiments thereof, the present invention provides a constant velocity joint having a reliable and durable structure, easy to assemble, and with sufficient mechanical strength suitable for using as torque transfer joints in the drive axle of an automobile, for example.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system having a first rotating shaft and a second rotating shaft coupled with the constant velocity joint, the constant velocity joint comprising:
    a hollow housing having a plurality of guide grooves therein, the guide grooves extending in an axial direction of the housing and spaced equally apart in a circumferential direction of the housing;
    a tripod having a plurality of trunnions, each trunnion positioned in a corresponding one of the guide grooves of the hollow housing; and
    a roller assembly including an inner roller, the inner roller having a spherical inner face for receiving a corresponding one of the trunnions therein, and an outer roller mounted on an outer face of each inner roller, the roller assembly for transmitting a load between the first and second rotating shafts to drive the driving system;
    wherein each trunnion includes two opposing spherical contact surfaces disposed in the directions subject to the load, and two opposing side surfaces disposed between the two opposing spherical contact surfaces and in the directions perpendicular to the spherical surfaces and not subjecting to the load;
    wherein a first cross sectional shape of the trunnion, the first cross section taken at an upper portion of the trunnion and in a direction perpendicular to the longitudinal axis of the trunnion, has a thickness larger than a maximum non-interfering thickness of the trunnion at a first lateral side, and the thickness is gradually decreased until it reaches a thickness the same as or 0-30% smaller than the maximum non-interfering thickness of the trunnion at a second lateral side opposite to the first lateral side of the trunnion, the maximum non-interfering thickness measured with the inner roller inclined by a predetermined degree relative to the longitudinal axis of the trunnion to assemble the trunnion into the inner roller without interference;
    wherein a second cross sectional shape of the trunnion, the second cross section taken at a lower portion of the trunnion and in a direction perpendicular to the longitudinal axis of the trunnion, has a thickness the same as or 0-30% smaller than the maximum non-interfering thickness of the trunnion at the first lateral side of the trunnion, and the thickness is gradually increased until it reaches a thickness larger than the maximum non-interfering thickness of the trunnion at the second lateral side of the trunnion;
    wherein cross-sectional shapes in-between the upper and lower portions are gradually varied from the cross-sectional shape at the upper portion to the cross-sectional shape at the lower portion of the trunnion.

2. The constant velocity joint of claim 1, wherein the cross sectional shape has a convex shape with the thickness at a central side increased from the thickness at both lateral sides of the trunnion.

3. The constant velocity joint of claim 1, wherein the cross sectional shape has an angled shape with the thickness at a central side increased from the thickness at both lateral sides of the trunnion.

4. The constant velocity joint of claim 1, wherein the thicknesses of the first and second lateral sides of the trunnion are selected to be in the ranges defined by the equation of:

$$0.5D \leq S \leq 0.7D;$$

$$1.0S \leq T \leq 1.2S;$$

where S represents the thickness of the trunnion at the one lateral side of the trunnion which is the same as or 0-30% smaller than the maximum non-interfering thickness, T represents the thickness of the trunnion at the opposite lateral side of the trunnion which is larger than the maximum non-interfering thickness of the trunnion, and D represents a spherical diameter of the trunnion.

5. The constant velocity joint of claim 1,
wherein the cross-sectional shape taken at an upper portion of the trunnion has the thickness larger than the maximum non-interfering thickness of the trunnion at the left lateral side, and the thickness the same as or 0-30% smaller than the maximum non-interfering thickness of the trunnion at the right side of the trunnion, and the cross-sectional contour between the left and right sides is gradually varied to define a convex shape as a whole;
wherein the cross-sectional shape taken at a lower portion of the trunnion has the thickness the same as or 0-30% smaller than the maximum non-interfering thickness of the trunnion at the left side, and the thickness larger than the maximum non-interfering thickness of the trunnion at the right side, and the cross-sectional contour between the left and right sides is gradually varied to define a convex shape as a whole; and
wherein the cross-sectional shapes in-between the upper and lower portions are gradually varied from the cross-sectional shape at the upper portion to the cross-sectional shape at the lower portion of the trunnion.

6. The constant velocity joint of claim 1, wherein each trunnion includes a neck portion below the trunnion, and the center of the neck portion is aligned with the longitudinal axis of the trunnion.

7. The constant velocity joint of claim 1, wherein each trunnion includes a neck portion below the trunnion, and the center of the neck portion is offset from the longitudinal axis of the trunnion.

8. The constant velocity joint of claim 7, wherein the inner roller includes a groove at a lower portion in the spherical inner face for facilitating assembly of the trunnion into the inner roller.

9. The constant velocity joint of claim 1, wherein the spherical inner face of the inner roller and the two opposing side surfaces defines a space there-between, and the space is for retaining grease therein to lubricate contact surfaces between the inner roller and the trunnion.

10. A constant velocity joint for a drive system having a first rotating shaft and a second rotating shaft coupled with the constant velocity joint, the constant velocity joint comprising:
a hollow housing having a plurality of guide grooves therein, the guide grooves extending in an axial direction of the housing and spaced equally apart in a circumferential direction of the housing;
a tripod having a plurality of trunnions, each trunnion positioned in a corresponding one of the guide grooves of the hollow housing; and
a roller assembly including an inner roller, the inner roller having a spherical inner face for receiving a corresponding one of the trunnions therein, and an outer roller mounted on an outer face of each inner roller, the roller assembly for transmitting a load between the first and second rotating shafts to drive the driving system;
wherein each trunnion includes two opposing spherical contact surfaces disposed in the directions subject to the load, and two opposing side surfaces disposed between the two opposing spherical contact surfaces and in the directions perpendicular to the spherical surfaces and not subjecting to the load;
wherein a first cross sectional shape of the trunnion, the first cross section taken at an upper portion of the trunnion and in a direction perpendicular to the longitudinal axis of the trunnion, has a thickness larger than a maximum non-interfering thickness of the trunnion at a first lateral side, and the thickness is gradually decreased as it reaches to a second lateral side opposite to the first lateral side of the trunnion, the maximum non-interfering thickness measured with the inner roller inclined by a predetermined degree relative to the longitudinal axis of the trunnion to assemble the trunnion into the inner roller without interference;
wherein a second cross sectional shape of the trunnion, the second cross section taken at a lower portion of the trunnion and in a direction perpendicular to the longitudinal axis of the trunnion, has a thickness larger than the maximum non-interfering thickness of the trunnion at the second lateral side of the trunnion, and the thickness is gradually decreased as it reaches to the first lateral side of the trunnion;
wherein a groove of circular or oval shape is formed on each of the two opposing spherical contact surfaces, the groove for retaining grease therein to lubricate contact surfaces between the inner roller and the trunnion;
wherein the thickness of the trunnion is gradually varied from the one lateral side of the trunnion to the opposite lateral side of the trunnion in an alternate manner relative to an axial distance from the center of the tripod.

11. The constant velocity joint of claim 10, wherein the groove on the spherical contact surface of the trunnion defines a main spherical contact area of predetermined size at inside area of the groove and a lateral spherical contact area at outside area of the groove.

12. The constant velocity joint of claim 10,
wherein the cross sectional shape taken at an upper portion of the trunnion has the thickness larger than the maximum non-interfering thickness of the trunnion at the left lateral side, and the thickness is gradually decreased until it reaches the thickness the same as or smaller than the maximum non-interfering thickness of the trunnion at the right side of the trunnion;
wherein the cross-sectional shape taken at a lower portion of the trunnion has the thickness the same as or smaller than the maximum non-interfering thickness of the trunnion at the left side, and the thickness is gradually increased until it reaches the thickness larger than the maximum non-interfering thickness of the trunnion at the right side of the trunnion; and
wherein the cross-sectional shapes in-between the upper and lower portions are gradually varied from the cross-sectional shape at the upper portion to the cross-sectional shape at the lower portion of the trunnion.

13. The constant velocity joint of claim 10, wherein the cross-sectional shape taken at an upper portion of the trunnion has the thickness larger than the maximum non-interfering thickness of the trunnion at the left lateral side, and the thickness the same as or smaller than the maximum non-interfering thickness of the trunnion at the right side of the trunnion, and the cross-sectional contour between the left and right sides is gradually varied to define a convex shape as a whole;

wherein the cross-sectional shape taken at a lower portion of the trunnion has the thickness the same as or smaller than the maximum non-interfering thickness of the trunnion at the left side, and the thickness larger than the maximum non-interfering thickness of the trunnion at the right side, and the cross-sectional contour between the left and right sides is gradually varied to define a convex shape as a whole; and wherein the cross-sectional shapes in-between the upper and lower portions are gradually varied from the cross-sectional shape at the upper portion to the cross-sectional shape at the lower portion of the trunnion.

14. The constant velocity joint of claim 10, wherein each trunnion includes a neck portion below the trunnion, and the center of the neck portion is aligned with the longitudinal axis of the trunnion.

15. The constant velocity joint of claim 10, wherein each trunnion includes a neck portion below the trunnion, and the center of the neck portion is offset from the longitudinal axis of the trunnion.

* * * * *